Figure 1:
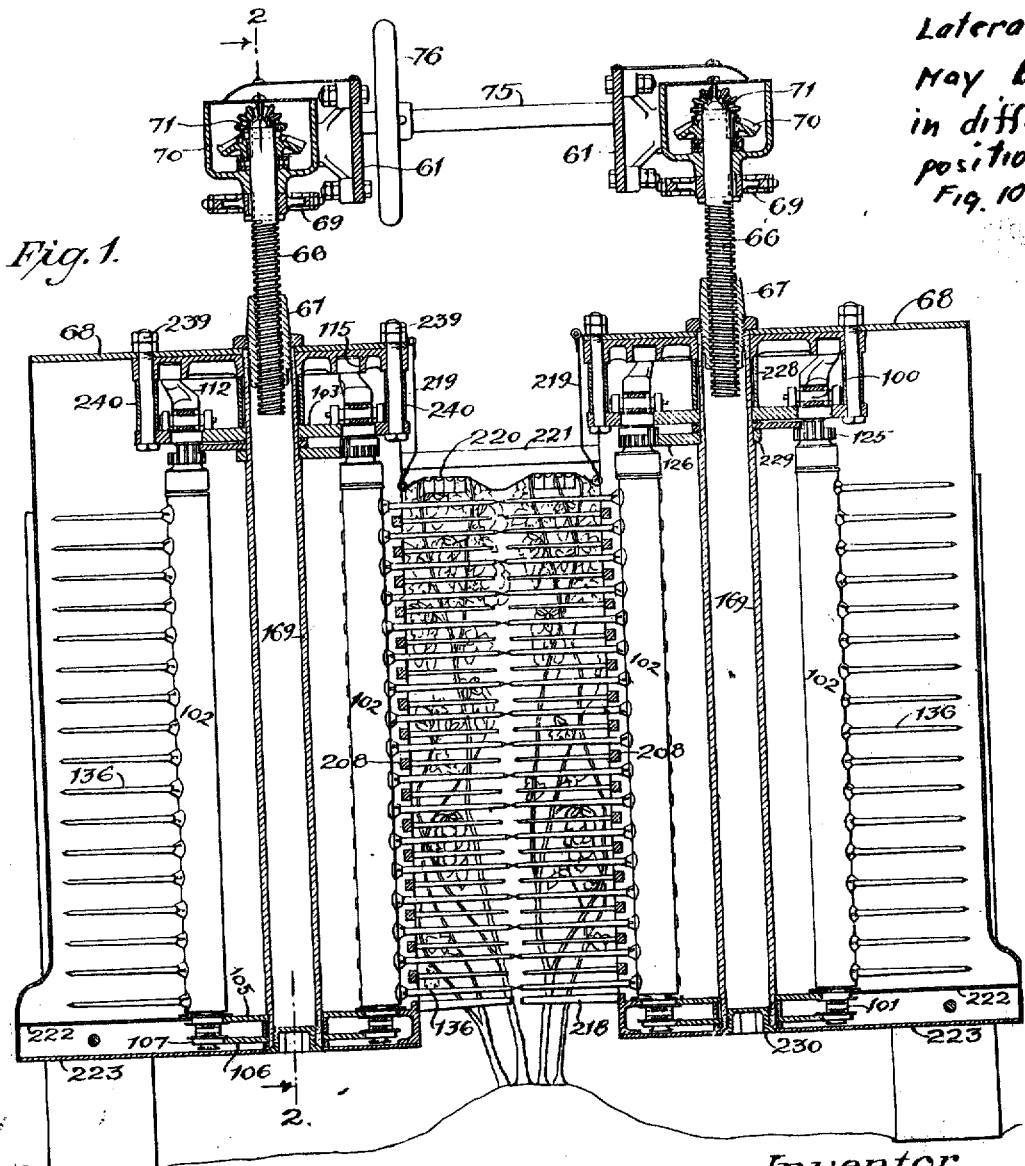

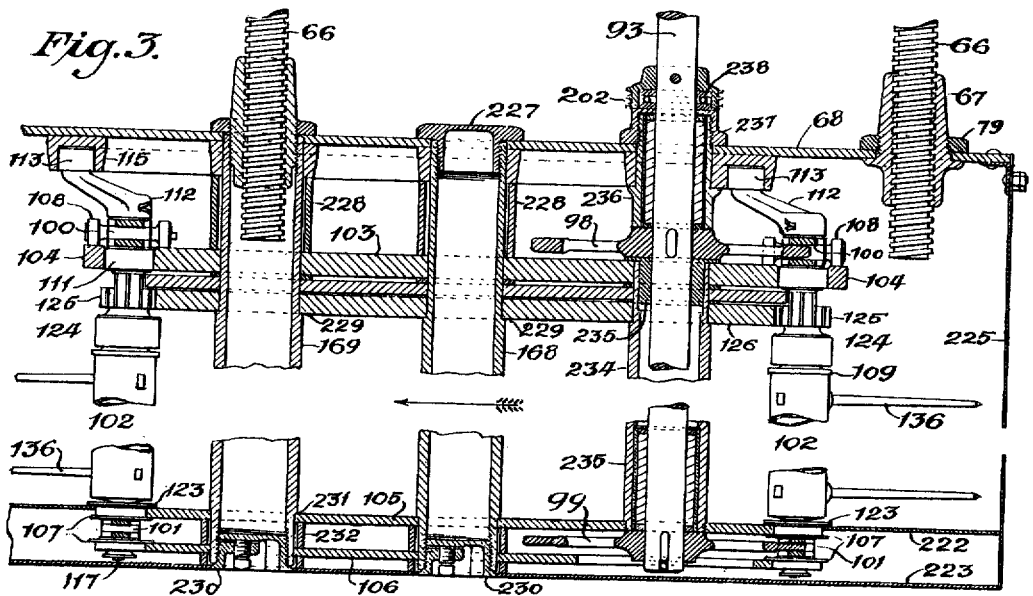
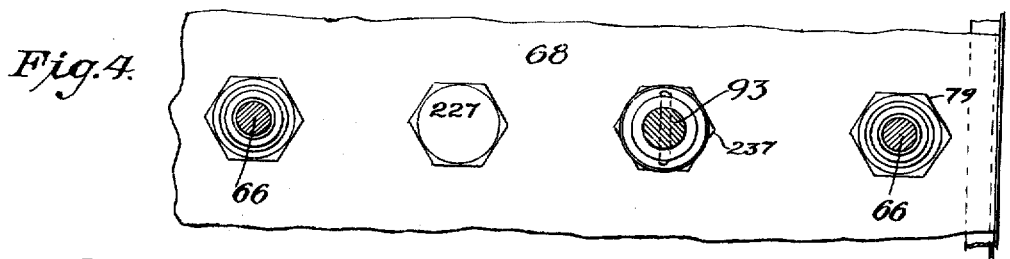
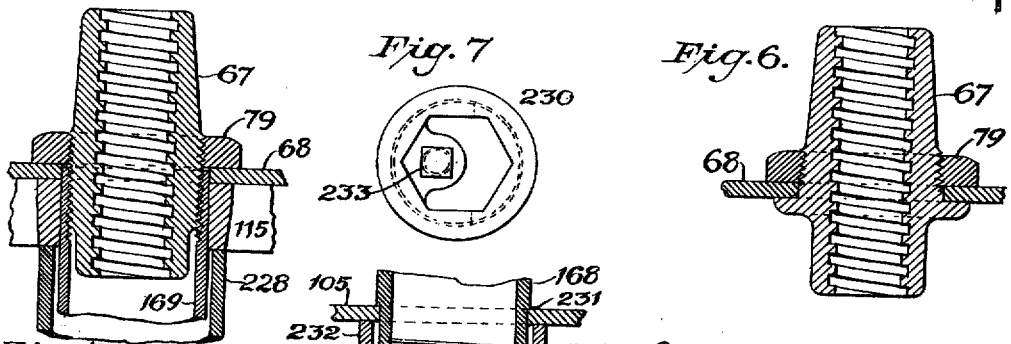
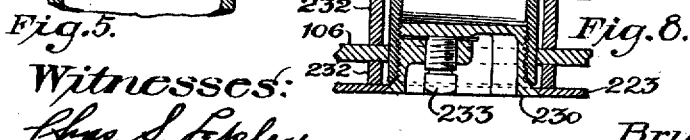

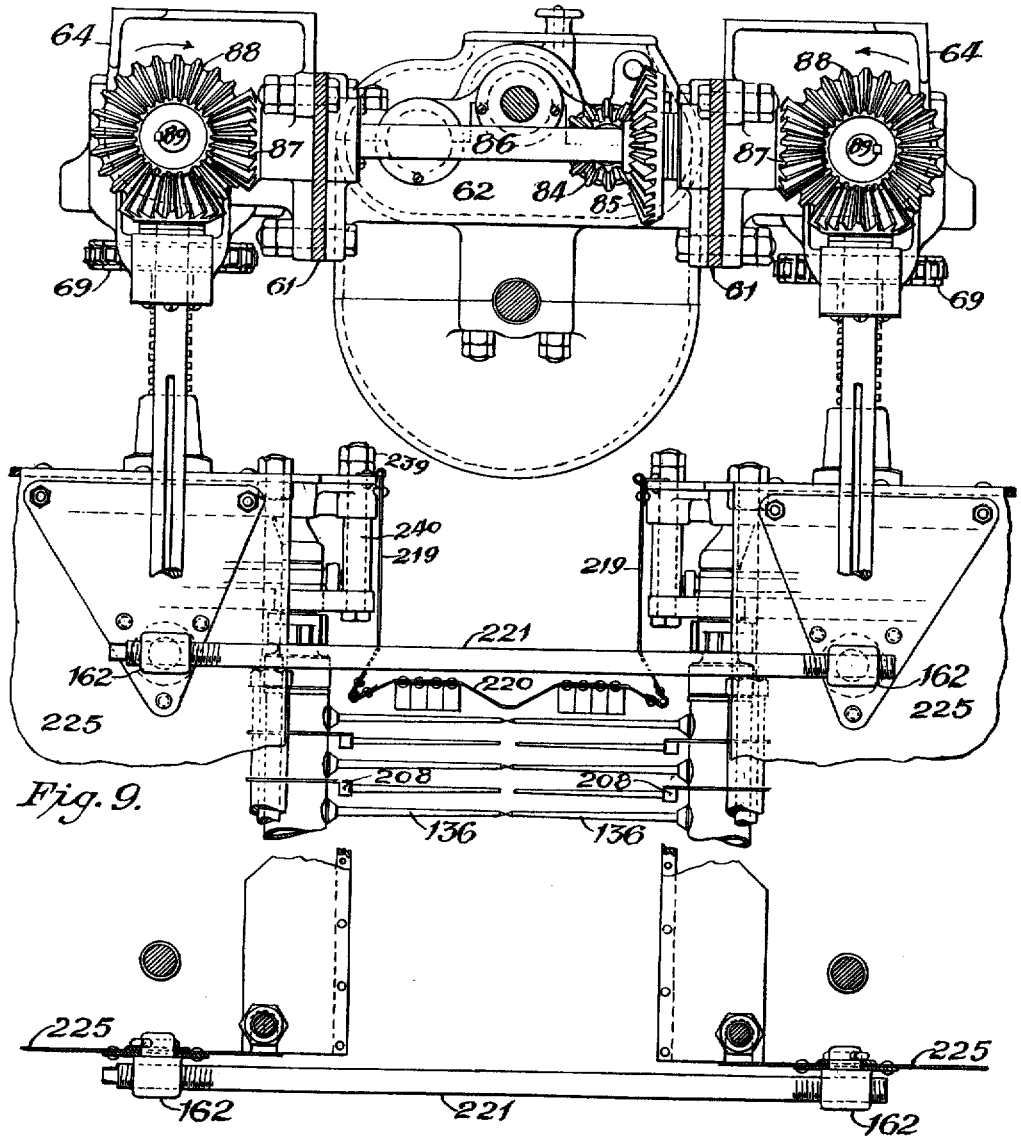

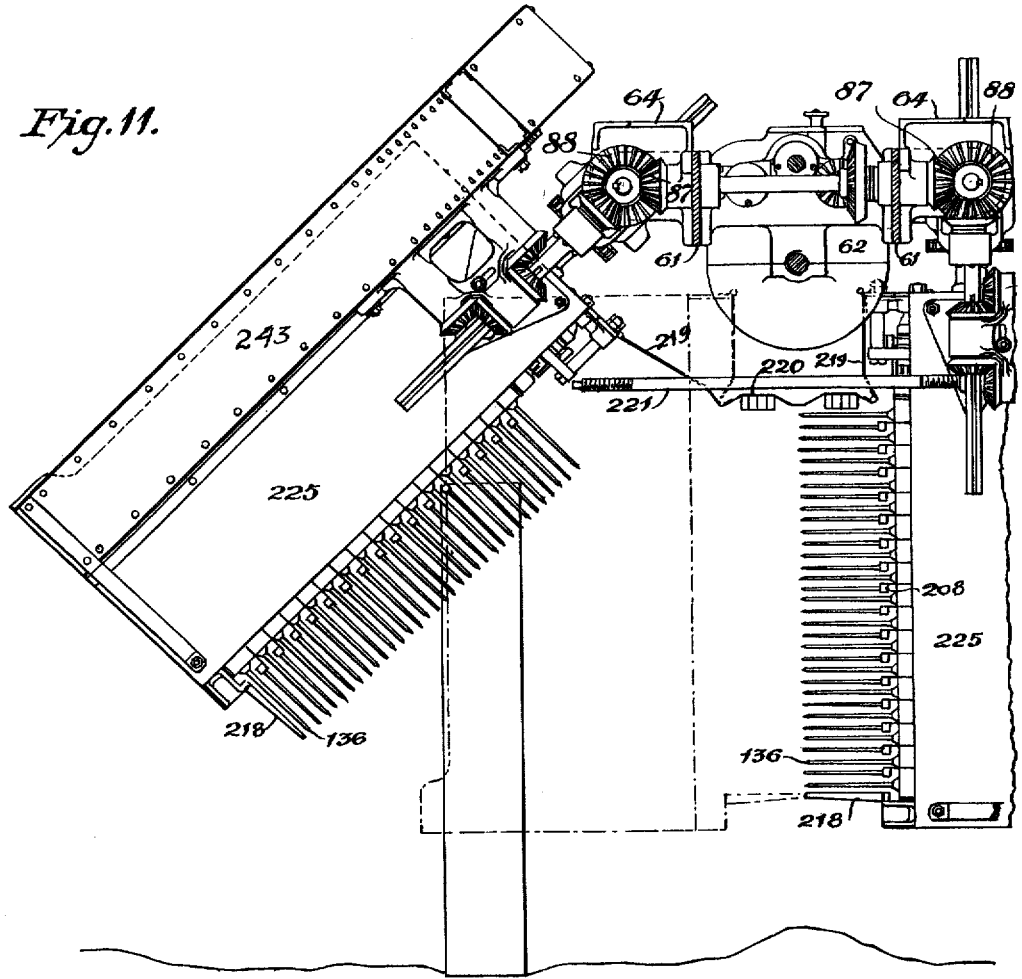

B. C. WHITE.
COTTON PICKER.
APPLICATION FILED JAN. 18, 1909.

1,004,835.

Patented Oct. 3, 1911.
17 SHEETS—SHEET 6.

Witnesses:
Chas. S. Lepley.
Huey Sols.

Inventor,
Bruce Clark White.
by C. M. Clarke
Attorney.

B. C. WHITE.
COTTON PICKER.
APPLICATION FILED JAN. 18, 1909.

1,004,835.

Patented Oct. 3, 1911.
17 SHEETS—SHEET 8.

Witnesses:
Chas. S. Lepley.
Harry Sims.

Inventor,
Bruce Clark White.
by Om Clarke
Attorney.

COLUMBIA PLANOGRAPH CO., WASHINGTON, D. C.

C. WHITE.
COTTON PICKER.
APPLICATION FILED JAN. 18, 1909.
1,004,835.
Patented Oct. 3, 1911.
17 SHEETS—SHEET 9.
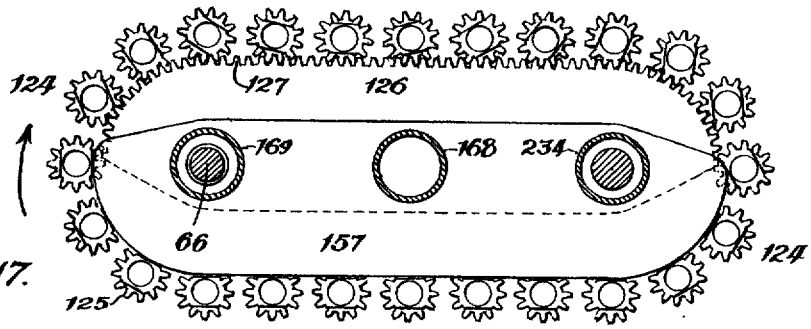
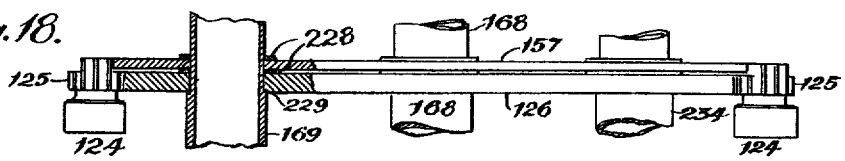
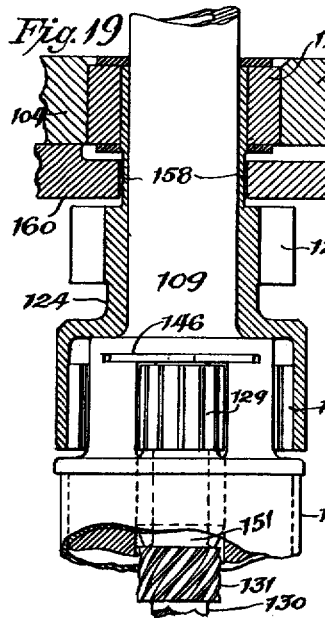
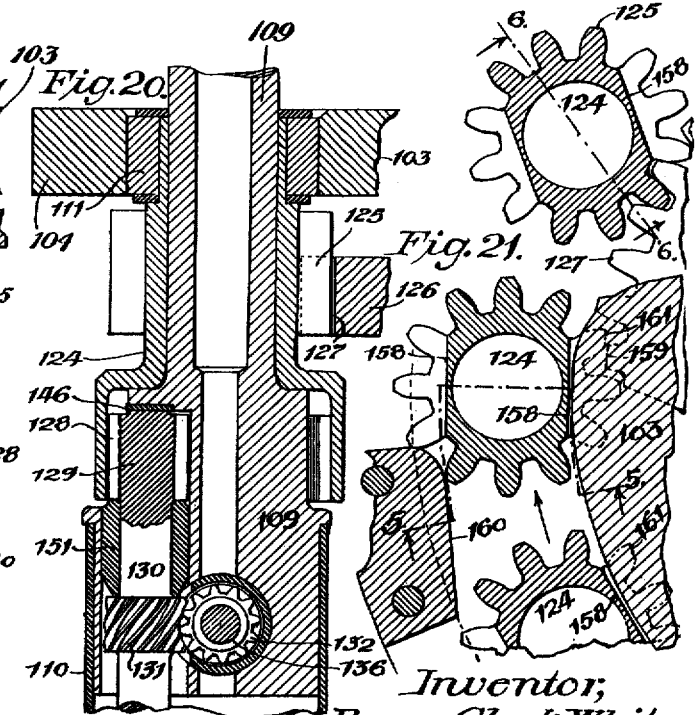
Witnesses:
Chas. S. Lepley.
Henry Sims.
Inventor;
Bruce Clark White.
by C. M. Clarke
Attorney.
COLUMBIA PLANOGRAPH CO., WASHINGTON, D. C.

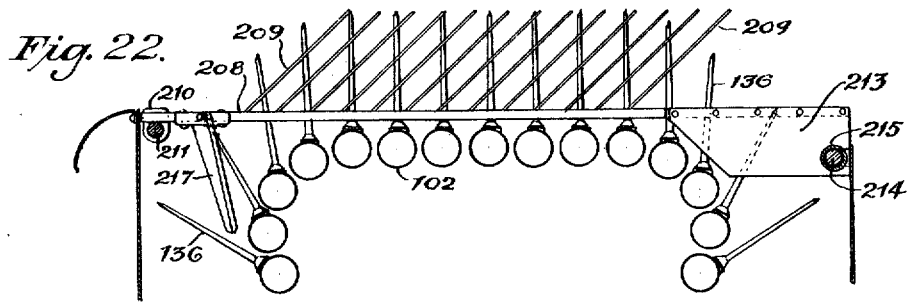
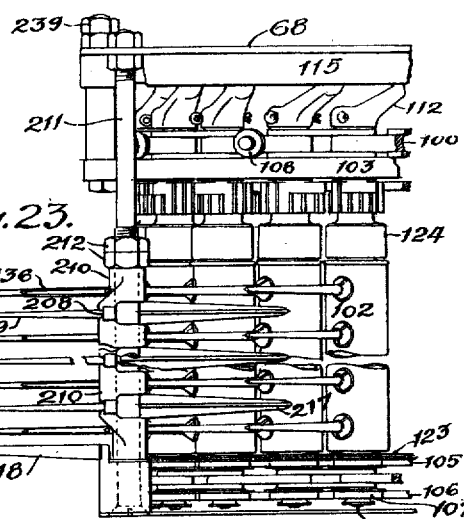
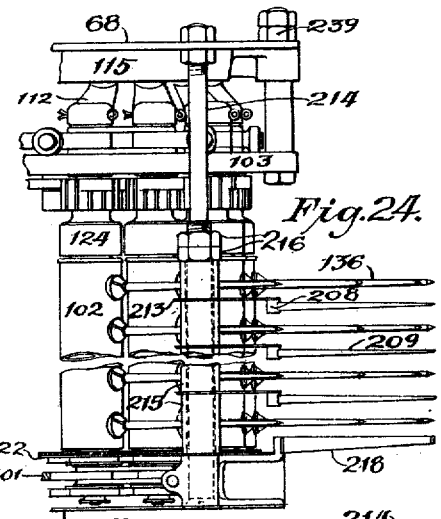
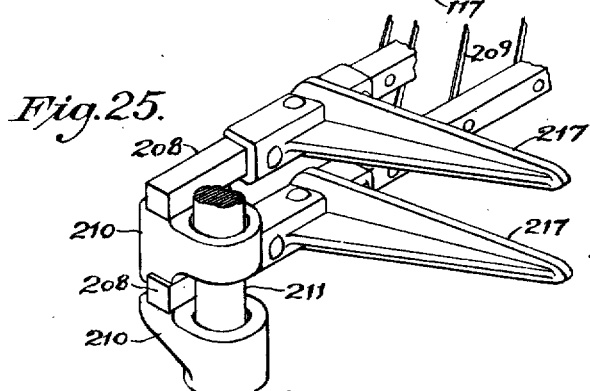
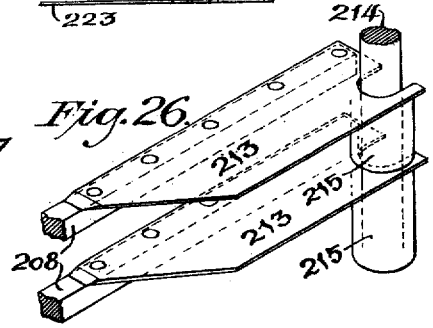

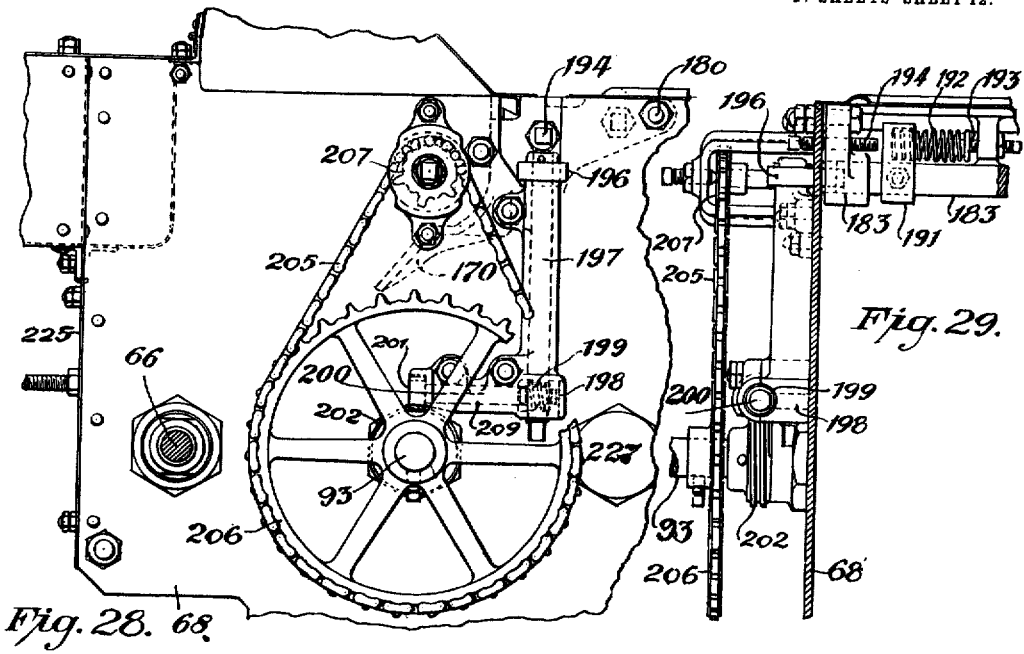
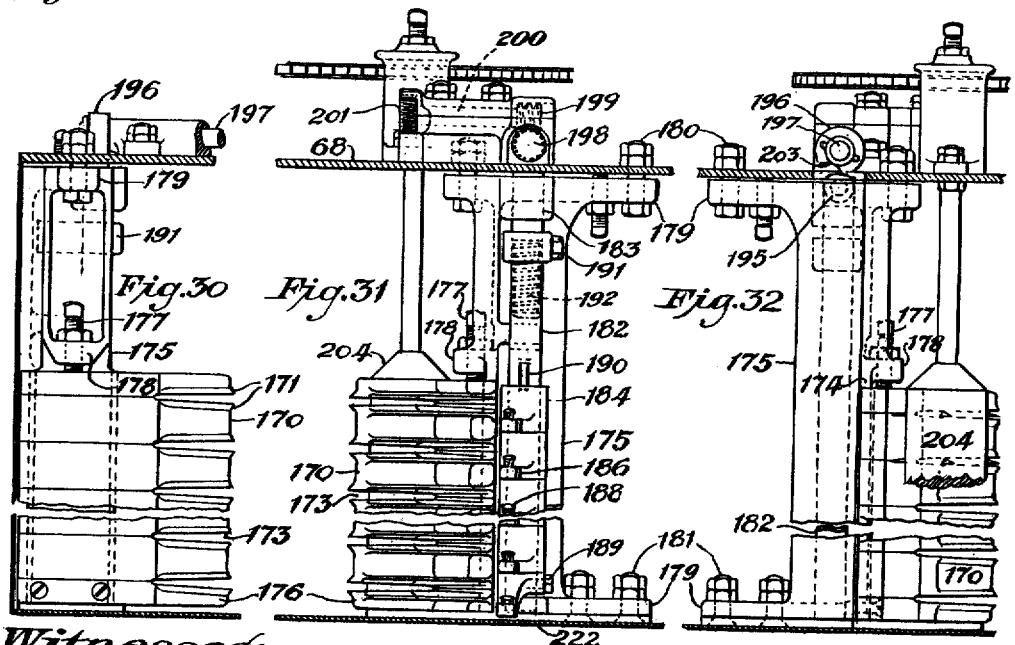

B. C. WHITE.
COTTON PICKER.
APPLICATION FILED JAN. 18, 1909.

1,004,835.

Patented Oct. 3, 1911.
17 SHEETS—SHEET 13.

Witnesses:
Chas. S. Lipley.
Henry Sims.

Inventor,
Bruce Clark White.
by C. M. Clarke
Attorney.

B. C. WHITE.
COTTON PICKER.
APPLICATION FILED JAN. 18, 1909.

1,004,835.

Patented Oct. 3, 1911.
17 SHEETS—SHEET 14.

B. C. WHITE.
COTTON PICKER.
APPLICATION FILED JAN. 18, 1909.
1,004,835.
Patented Oct. 3, 1911.
17 SHEETS—SHEET 15.
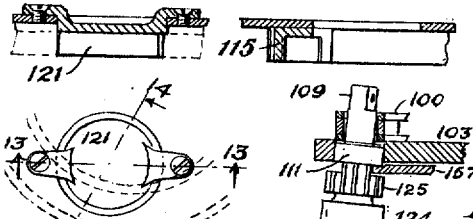
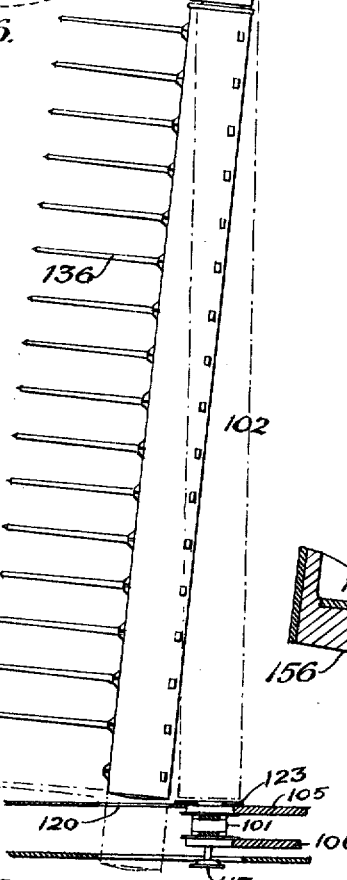
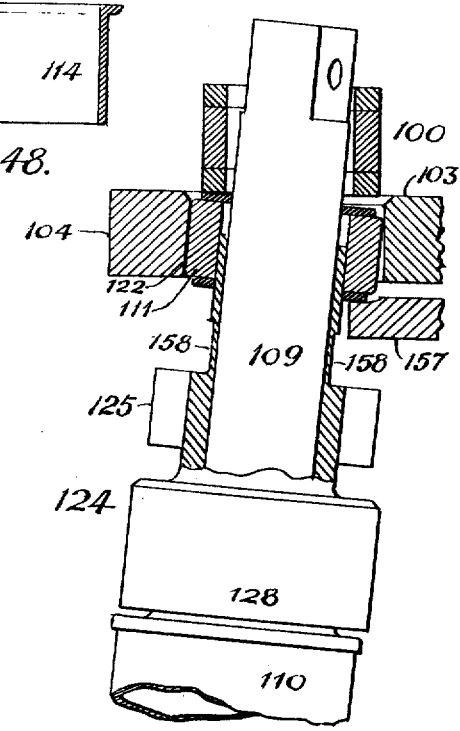
Witnesses:
Chas. S. Lipley
Henry Sens
Inventor,
Bruce Clark White.
by O. M. Clarke
Attorney.

B. C. WHITE.
COTTON PICKER.
APPLICATION FILED JAN. 18, 1909.

1,004,835.

Patented Oct. 3, 1911.
17 SHEETS—SHEET 16.

Witnesses:
Chas. S. Lepley
Henry Sens

Inventor,
Bruce Clark White.
by C. M. Clarke
Attorney.

B. C. WHITE.
COTTON PICKER.
APPLICATION FILED JAN. 18, 1909.

1,004,835.

Patented Oct. 3, 1911.

17 SHEETS—SHEET 17.

Witnesses:
Chas. S. Lepley.
Henry Sens.

Inventor,
Bruce Clark White.
by C. M. Clarke
Attorney.

UNITED STATES PATENT OFFICE.

BRUCE CLARK WHITE, OF ROCHESTER, PENNSYLVANIA, ASSIGNOR, BY MESNE ASSIGNMENTS, TO PRICE-CAMPBELL COTTON PICKER CORPORATION, OF WILMINGTON, DELAWARE, A CORPORATION OF DELAWARE.

COTTON-PICKER.

1,004,835.   Specification of Letters Patent.   Patented Oct. 3, 1911.

Application filed January 18, 1909. Serial No. 472,908.

*To all whom it may concern:*

Be it known that I, BRUCE CLARK WHITE, a citizen of the United States, residing at Rochester, in the county of Beaver and State of Pennsylvania, have invented certain new and useful Improvements in Cotton-Pickers, of which the following is a specification, reference being had therein to the accompanying drawing.

My invention relates to that type of cotton pickers shown in Angus Campbell's United States Patent No. 542,794, granted July 16, 1895, wherein the framework of the machine is mounted upon the running gear and affords a central longitudinal passage which straddles and overrides the plants in the progress of the machine, and working across said passage from opposite sides are a series of picker fingers that are thrust longitudinally into and revolved in the plant to gather cotton from the open bolls, and then withdrawn longitudinally from the plant and passed across stripper mechanism to strip the cotton from the fingers. In this type of machine, the fingers are arranged in a succession of vertical rows moving rearwardly relatively to the machine, while in the plants, at a speed equal to the forward progress of the machine along the row of plants; the mechanism which operates and controls the movements of the fingers on each side of the machine being mounted and inclosed in a rectangular box or drum hung on either side of the machine frame, between the forward and rear wheels.

It is important that a cotton-picking machine should be power-propelled, instead of animal-drawn, for the reason that when men or beasts are employed to propel the machine, they are likely, if numerous enough to operate the machine, to trample down the cotton plants.

The machine is mounted upon four wheels and is a motor driven dirigible vehicle adapted to straddle a row of plants in the usual manner of such machines. A high narrow arched centrally located passage is thus provided lengthwise of the machine to accommodate the plants, the said passage terminating in a flaring hood-shaped opening at the front into which the plants are gathered and deflected. Elevators extend from the base of the drum upward and rearward to deliver the picked cotton to baskets, bags or any suitable receptacles at the rear.

An operator from his seat above the machine frame controls and guides the operation of the machine.

Machines of this type have previously been unsuccessful for the reason that the deflection of the plants was continued after the fingers have taken positions between the stalks of the plants thus causing excessive finger breakage. Another cause of finger breakage has been due to the fact that the drums were mounted rigidly in the frames thus preventing free lateral movement of the fingers when necessary to compensate for the crookedness of the rows or inaccurate steering. Other reasons for failure have been due to great complication in the construction of the finger mounting and carriers, also to the complicated cam mechanism to control the direction in which the fingers point, and in the complication of the drum structure. Other difficulties have appeared in the complication of the finger driving mechanism throughout the whole train of gearing from the motor to the fingers. The inaccessibility of parts, the lack of means to provide and preserve proper alinement and relation of moving members and the multiplicity of small parts have all been features which have hitherto caused machines of this type to fail to harvest cotton in any practical manner.

Among the leading objects of my invention have been the prevention of finger breakage. This has been accomplished in part by so forming the deflecting hood and passage through the machine that the cotton plants will be wholly deflected before the fingers are enmeshed in them. Another means of prevention I have devised by so hanging the drums or picking mechanism that they may swing laterally, thereby preventing the forcible thrust of the fingers into or through heavy stalks of the plants.

Another object of my invention has been to provide means for rotating, moving, mounting and directing the fingers which, should be at once simple, substantial and effective and without liability to derangement.

Another object of my invention has been to provide means for automatically cleaning all of the fingers of sap along the line of the finger teeth, whereby their effectiveness as cotton gatherers will be maintained.

Further objects of my invention have been to so arrange the structure and mechanism as to require the fewest parts in the simplest form, all accessible or quickly removed and as substantial as necessary.

I accomplish these objects by the devices and combination of parts shown in the drawings and hereinafter more fully described and claimed.

Figure 2:
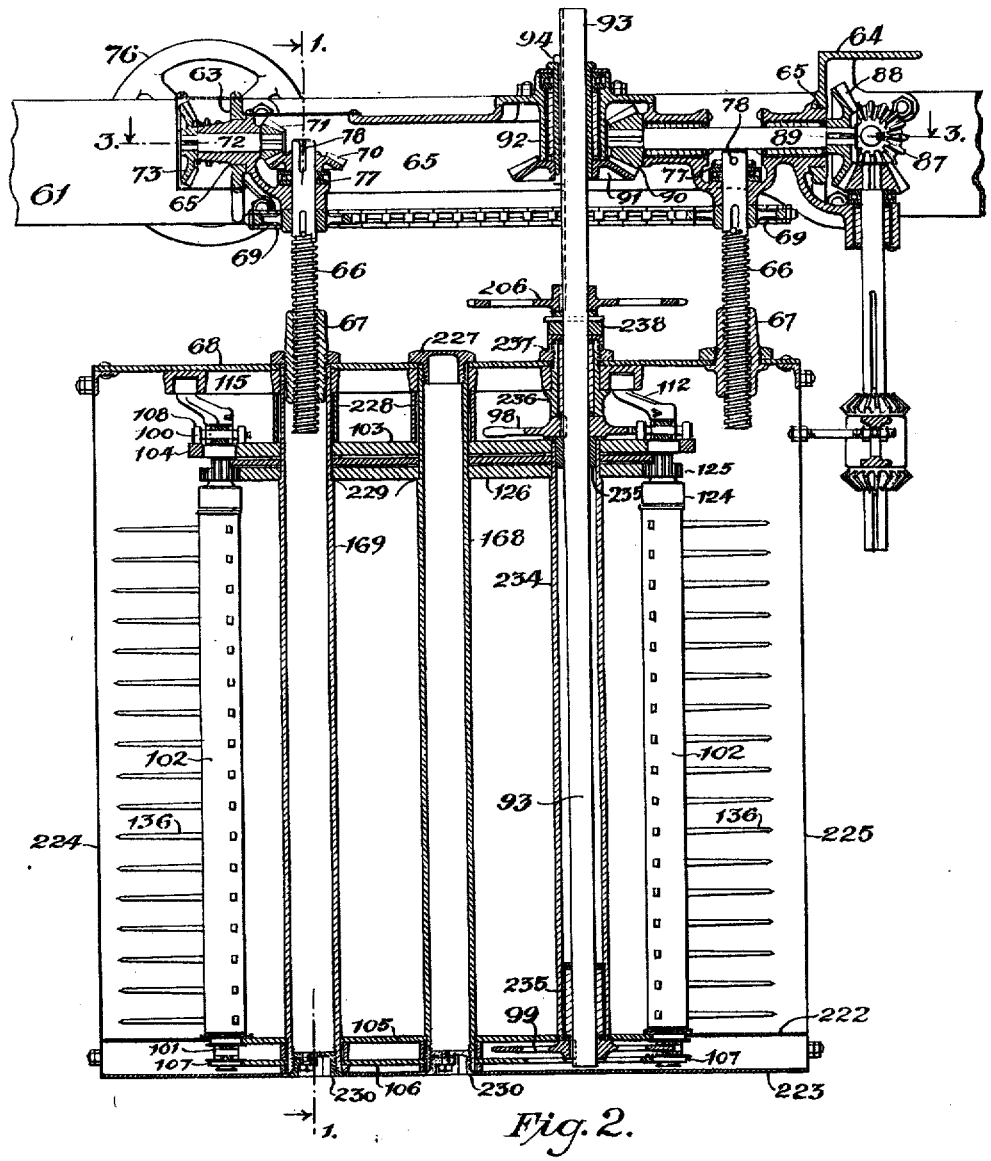
Figure 12:
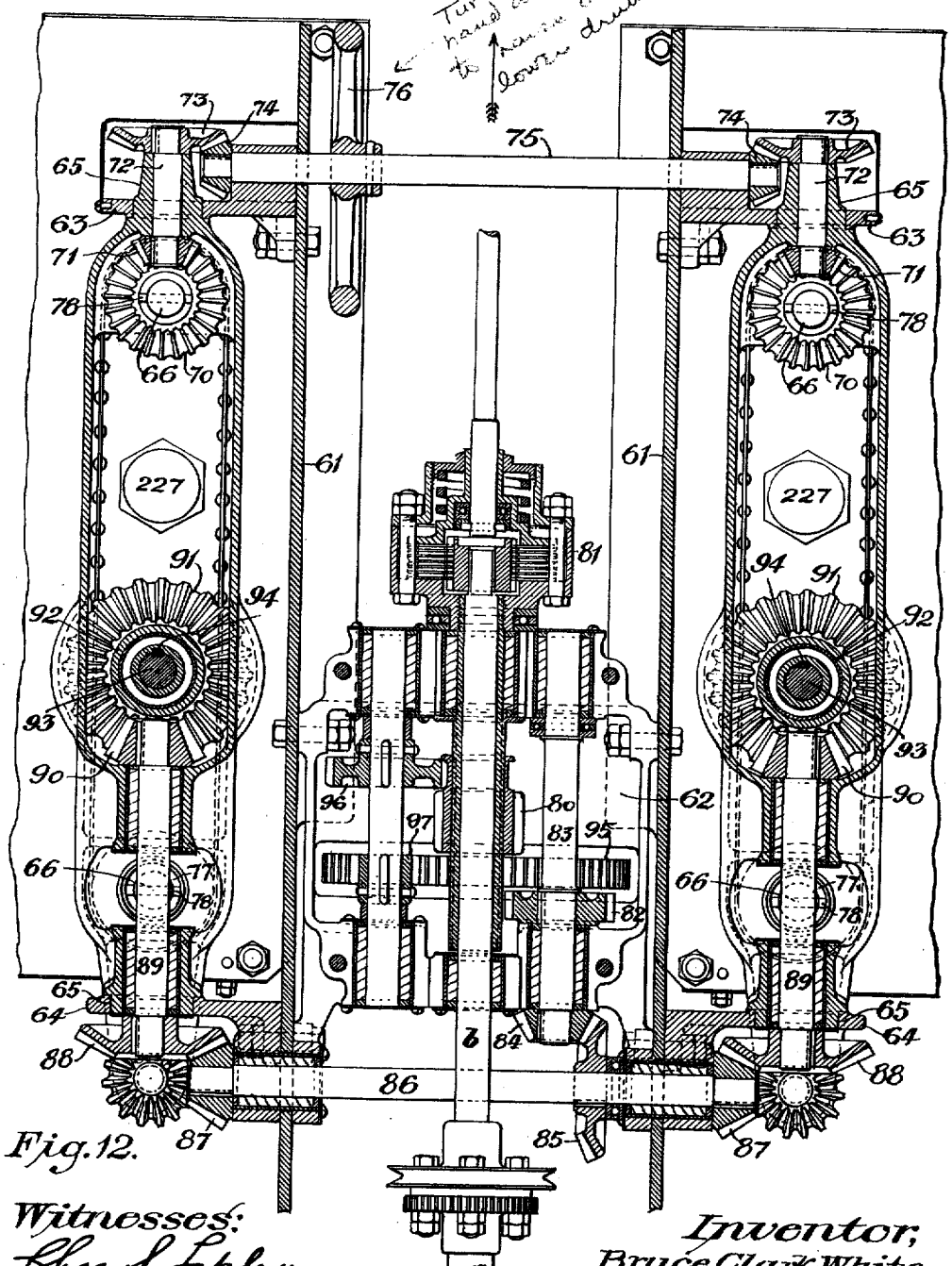
Figure 13:
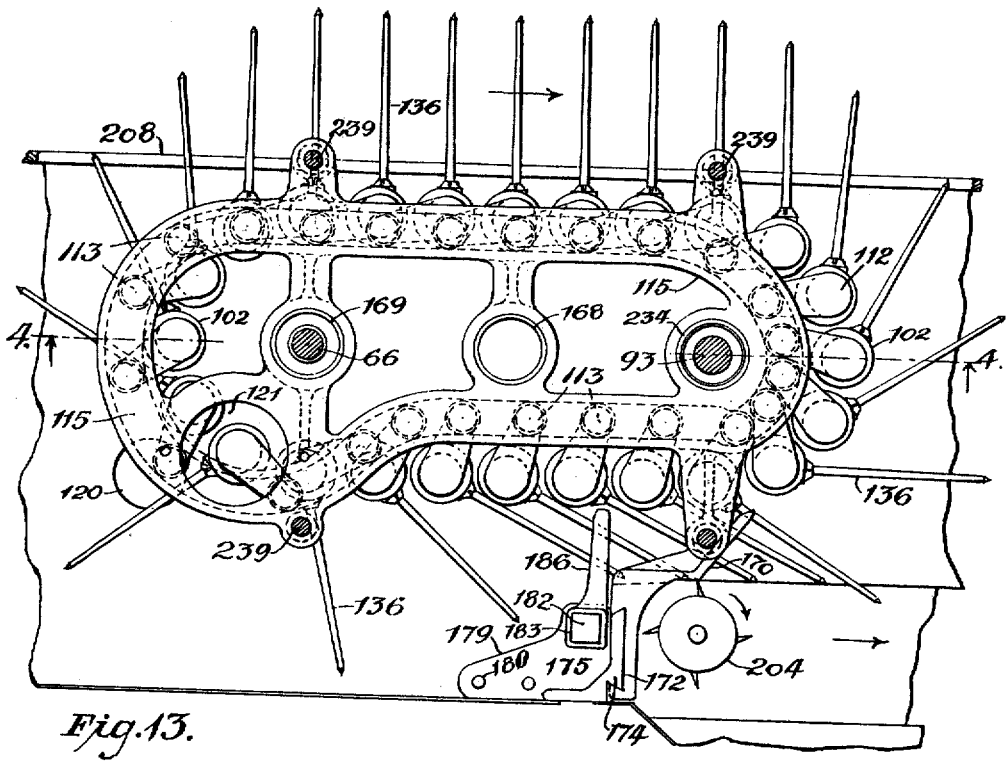
Figures 14, 58, 59:
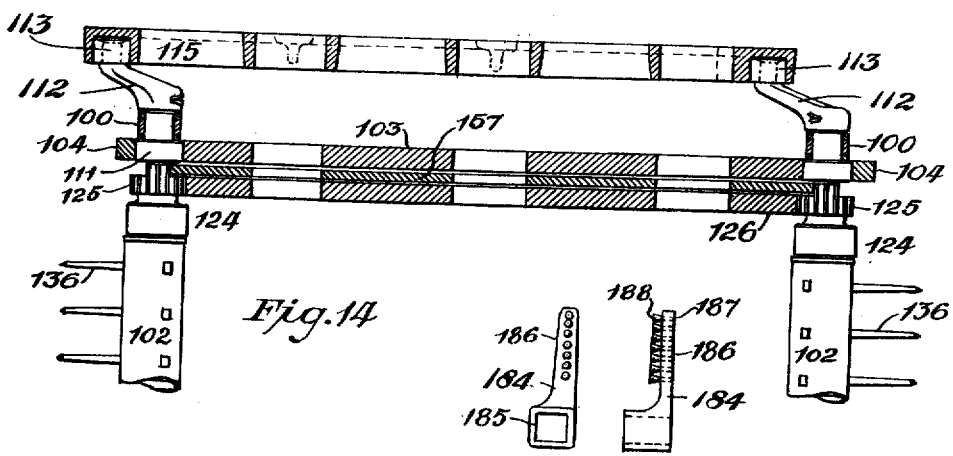
Figure 15:
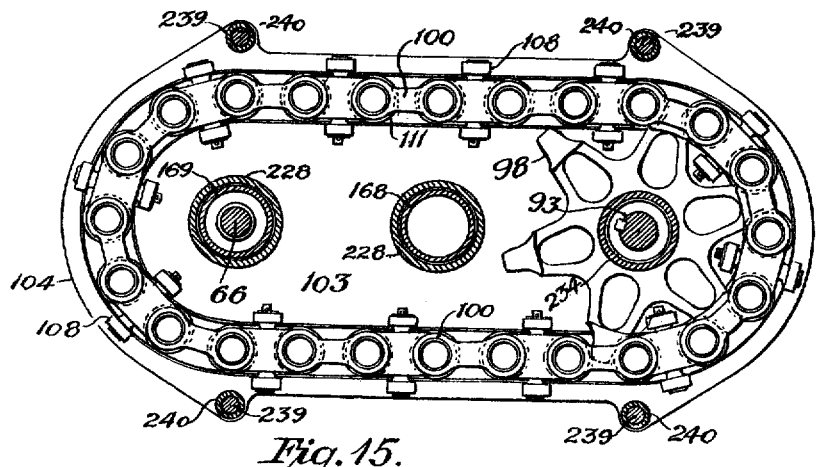
Figure 16:
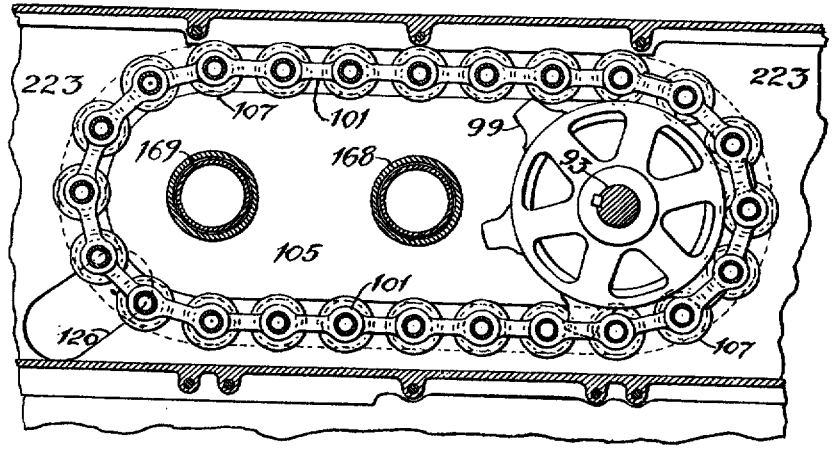

In the drawings;—Figure 1 is a general transverse section on line 1—1 of Fig. 2. Fig. 2 is a longitudinal section through one of the drums on line 2—2 of Fig. 1. Fig. 3 is a partial longitudinal section, partly broken away and enlarged, on the same plane, line 2—2 of Fig. 1. Fig. 4 is a partial plan view of the top of the drum. Fig. 5 is a sectional view of the forward fixed nut on the top of the drum whereby the drum is raised and lowered. Fig. 6 is a sectional view of the rearward fixed nut for the same purpose. Fig. 7 is a detail of the clamping lock nuts at the base of the drum columns. Fig. 8 is a vertical sectional view of the same. Fig. 9 is a partial rear view of the drums and of the cross shaft which drives them. Fig. 10 is a plan view of a portion of Fig. 9 showing the connection between the drums. Fig. 11 is a rear view similar to Fig. 9, showing one drum swung outward. Fig. 12 is a horizontal section on line 3—3 of Fig. 2 showing the main frame, brackets, drum hangers, drum drive and transmission. Fig. 13 is a plan view of the drum with its top plate removed showing cam, etc. Fig. 14 is a vertical longitudinal section on the line 4—4 of Fig. 13, showing cam, cam arms, carriers and track but with other parts removed. Fig. 15 is a plan view of the upper carrier chain and its track, also upper sprocket wheel. Fig. 16 is a plan view of the lower carrier chain and its rollers and track, also the lower sprocket wheel. Fig. 17 is a plan view of the main pinions of the carriers, also the rack and stop guide plate. Fig. 18 is a side elevation of same, partly in section. Fig. 19 is an enlarged view of a carrier head and main pinions, partly in section, on the line 5—5 of Fig. 21. Fig. 20 is a similar section but taken on the line 6—6 of Fig. 21. Fig. 21 is a similarly enlarged horizontal sectional view of the main pinions of the carriers, showing them leaving the guide plate and engaging with the rack whereby their rotation is effected. Fig. 22 is a detail plan view of the strips and spring leaves between the fingers. Fig. 23 is a partial front view, broken away, of the inside of the drum showing the carriers, etc. Fig. 24 is a similar partial rear view of the inside of the drum, showing the carriers, etc.

Figure 27:
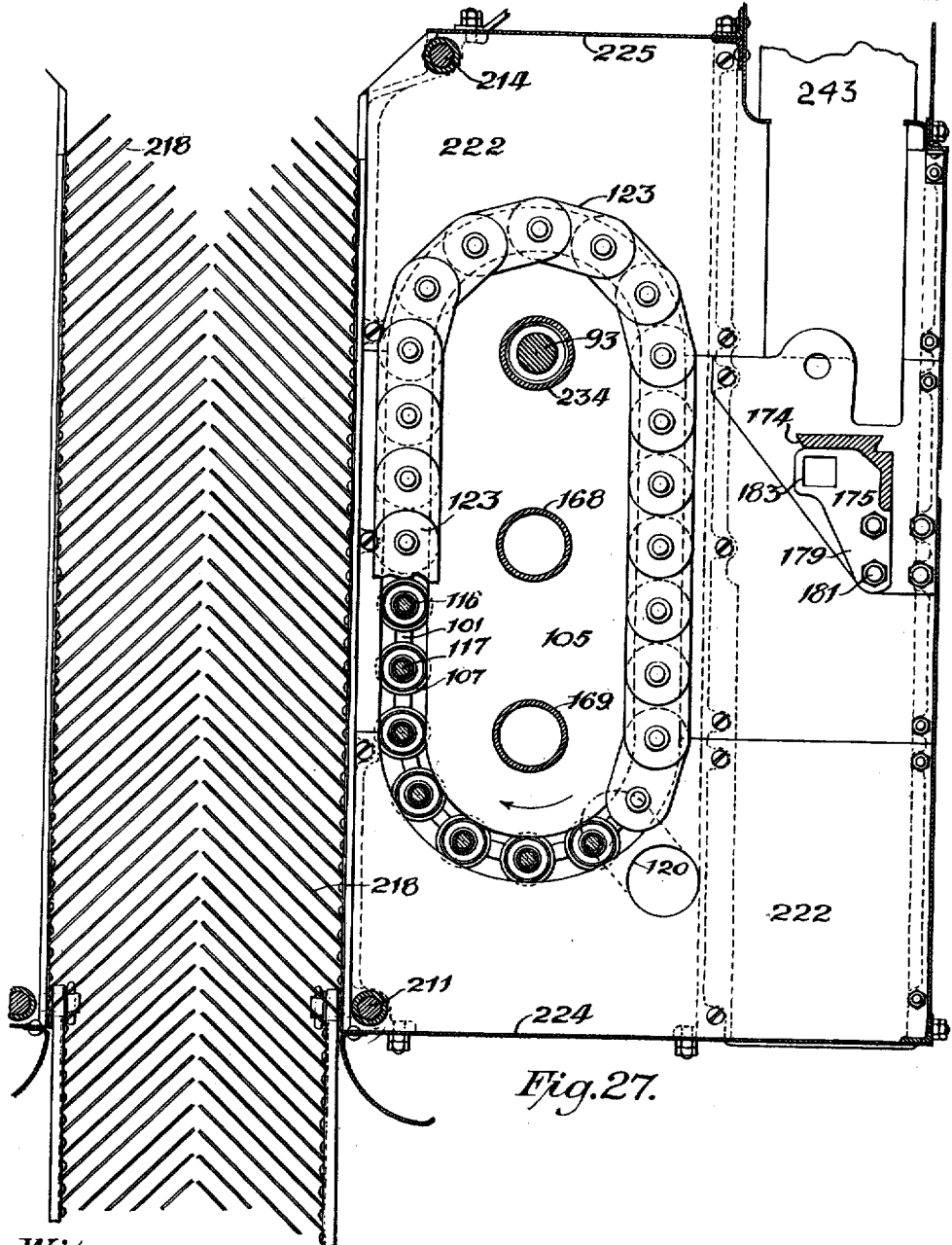
Figure 33:
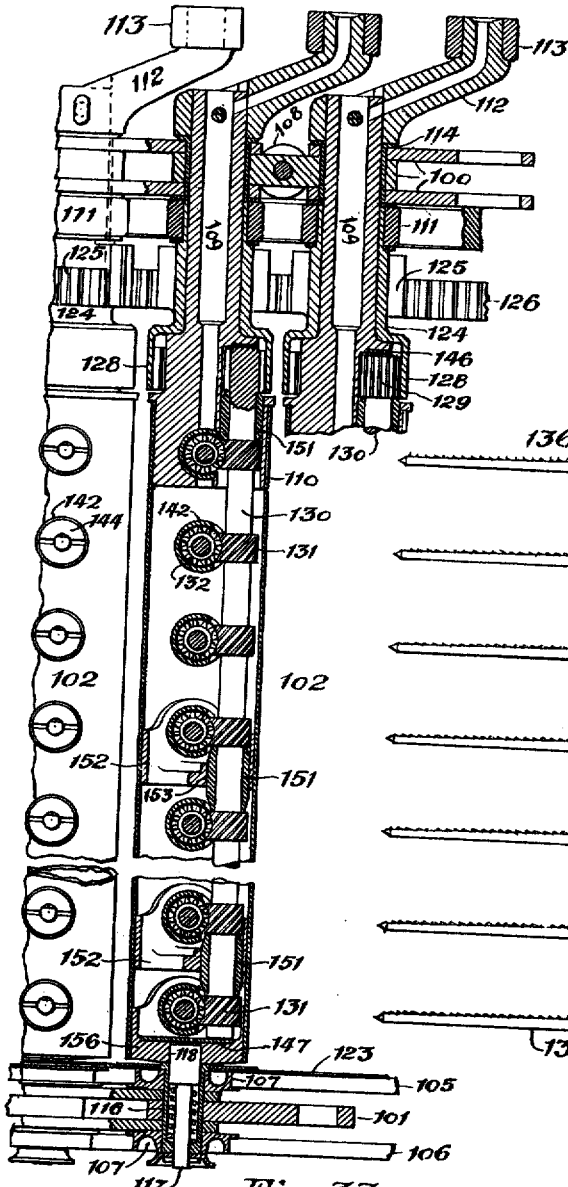
Figure 34:
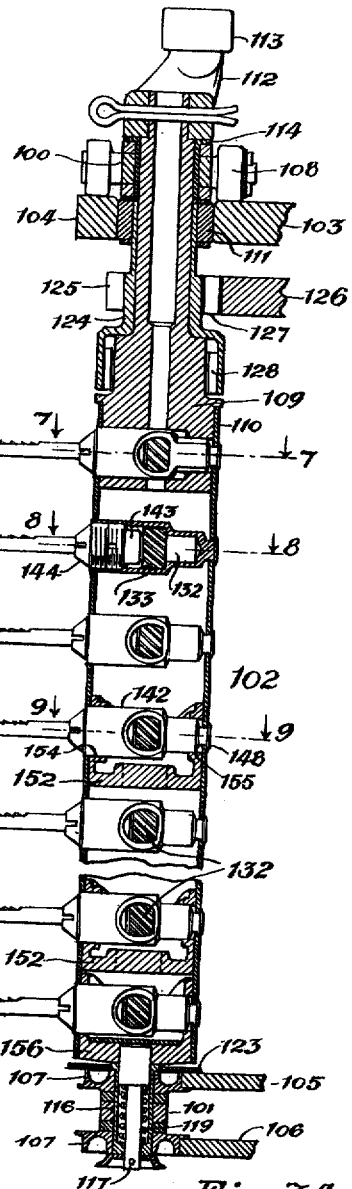
Figure 50:
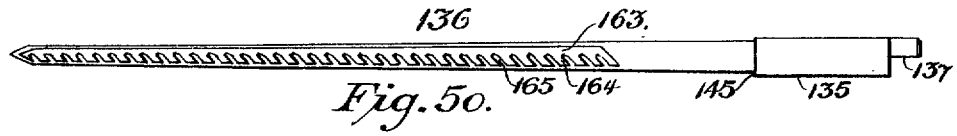
Figure 51:
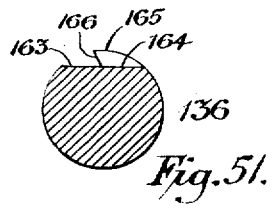
Figure 52:
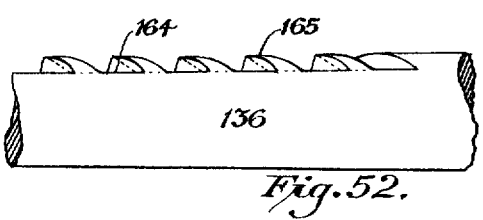
Figure 54:
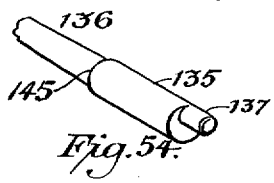
Figure 53:
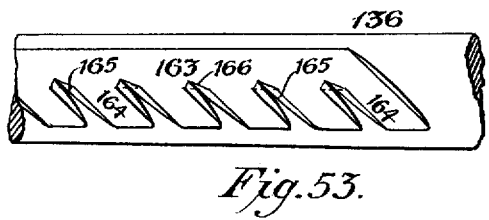
Figure 56:
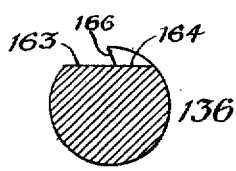
Figure 55:
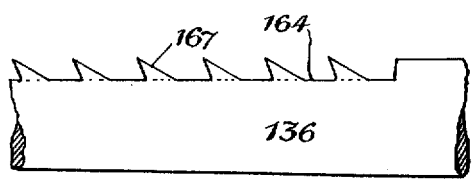
Figure 57:
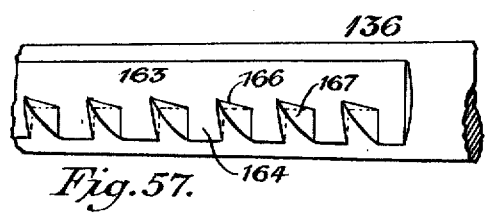
Figure 60:
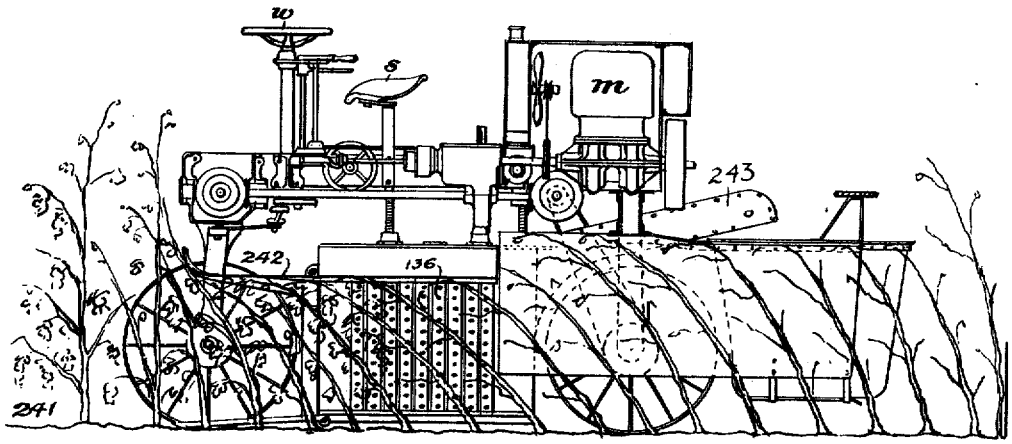
Figure 61:
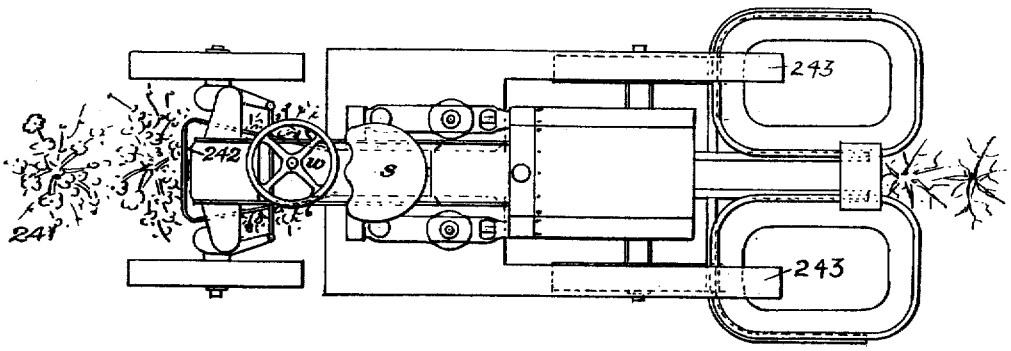

Fig. 25 is a detail view in perspective of the forward end of the strips showing separator points. Fig. 26 is a detail in perspective showing the rear end of the strips. Fig. 27 is a plan view at the floor of the drum, showing the sheath plates or links protecting the track of the lower carrier rollers, also showing the elastic floor between the drums to catch falling cotton. Fig. 28 is a partial plan view of the top of the drum showing the drive to the spike roller, also the mechanism for operating the brush bar. Fig. 29 is an end elevation of the same. Fig. 30 is a face view, partly broken away, of the strippers and stripper column. Fig. 31 is an inside view of the strippers showing the brush-bar. Fig. 32 is an outside view of the same, showing cam for operating the brush bar. Fig. 33 is a vertical sectional view, partly broken away, showing one carrier in longitudinal section and one in elevation. Fig. 34 is a transverse vertical section through a carrier, partly broken away, showing the picking fingers. Fig. 35 is a horizontal cross section enlarged, of a carrier through the head on line 7—7 of Fig. 34. Fig. 36 is a similar section on line 8—8 of Fig. 34. Fig. 37 is a similar section on line 9—9 of Fig. 34. Fig. 38 is a detail section on line 10—10 of Fig. 39 of a finger socket. Fig. 39 is a detail cross section of the finger-socket on line 11—11 of Fig. 38. Fig. 40 is a detail view in perspective of a ring or cup in the carrier through which is inserted a finger-socket and into which is fitted the bearing for the vertical spiral shaft. Fig. 41 is a detail view in perspective of the top carrier head. Fig. 42 is a sectional detail view of the finger pinion on line 12—12 of Fig. 43. Fig. 43 is an end view of same. Fig. 44 is a perspective detail view of the cup at the bottom of each carrier through which is inserted the finger socket. Fig. 45 is a sectional view through the removable cam section at top of the drum on line 13—13 of Fig. 46. Fig. 46 is a plan view of the removable cam section. Fig. 47 shows the carrier inclined to a position for removal, taken along the sectional line 14—14 of Fig. 46, the removable cam section having been removed. Fig. 48 is a sectional detail view of a removable bushing in the upper carrier chain, the removal of which permits the carrier to be inclined as shown in Figs. 47 and 49. Fig. 49 is an enlarged sectional view showing a carrier and the parts mounted thereon in the inclined position for removal. Fig. 50 is a side elevation of a picking finger. Fig. 51 is a transverse section of the finger between the teeth. Fig. 52 is an enlarged view of a part of the body of the finger showing a rear view of the teeth. Fig. 53 is an enlarged view of a part of the body of the finger, showing a plan view of the teeth. Fig. 54 is a detail view in perspective of the driven end of the finger. Figs. 55, 56 and 57 are respectively a side view, section and plan view of a portion of a finger showing an alternative design of tooth. Figs. 58 and 59 Sheet 7 are respectively a plan and side view of a brush. Fig. 60 is a longitudinal section through the machine from end to end on the center line showing plants in position. Fig. 61 is a plan view of Fig. 60.

Referring to the several figures of the drawings, in which corresponding parts are indicated by corresponding reference characters, 61 represents the longitudinal bars forming the main frame of the machine between and upon which are mounted the motor and power transmission devices to the gearing within the transmission case 62, and also to the gearing and driving mechanism connected to the wheels of the vehicle whereby it is caused to traverse the cotton field. Upon this main frame 61 are also mounted a steering wheel $w$ and a seat $s$ for the operator. At either end of the frame are legs extending downward and outward to the axles of the four wheels.

Projecting laterally from each frame bar 61 is a forward bracket 63 and a rear bracket 64, all provided with annular openings in which are journaled the trunnion ends of hollow frames 65 called drum hangers, one on either side of the machine.

Depending from each drum hanger and journaled therein are two screws 66 engaging nuts 67 fixed to the top plate of the drum or inclosure for the supported picking mechanism below the top plate 68.

The screws 66 are provided with sprocket wheels 69 around each pair of which is longitudinally trained a sprocket chain, thus connecting them in such well known manner as to cause the drum to be raised or lowered equally at both ends when the screws revolve. The forward screw is provided with a bevel gear 70 engaged by a pinion 71 secured to a short horizontal shaft 72 journaled in the center or axis of the drum hanger 65, whereby the latter may swing laterally without affecting the engagement of the gearing.

Upon the front end of shaft 72 is secured another bevel gear 73 meshing into a pinion 74 at the end of the cross shaft 75 upon which is secured the hand wheel 76. It will be understood that this mechanism is duplicated on each side of the machine and that the arrangement is such that the turning of the hand wheel will raise or lower both ends of both drums simultaneously and equally.

The screws 66 are provided with collars 77 retained by pins 78 the removal of which permits the ready removal of the drums. See Fig. 2. The rearward nut 67 is provided with a flange under the plate 68 of the drum, (see Figs. 3 and 6) and each nut 67 is clamped to the said plate by a jam nut 79 which if loosened permits this nut 67 to be turned for adjusting the level of the drum.

The motor $m$ rotates the main shaft $b$ and its pinion 80 in the transmission case, (see Fig. 12) when connection is made through the friction clutch 81. This pinion 80 may be slid lengthwise by the operator by means of a handle or lever whereby it will engage different gears as follows:—When slid to its extreme rearward position it engages only the gear 82 which is secured on the shaft 83. On the rear end of this shaft is secured a bevel pinion 84 which meshes into the bevel gear 85 secured to the cross shaft 86. This shaft has keyed to it at each end pinion 87. These in turn mesh with bevel gears 88 keyed to shafts 89 at each side which journal concentrically one in each drum hanger trunnion 65, whereby the axes of said shafts 89 remain in fixed position. However the drum hangers may be swung laterally in their supporting brackets 63 and 64, similar to shafts 72.

To the inner ends of shafts 89 are secured pinions 90 which mesh with and engage the bevel gear 91 mounted to rotate in a journal bearing 92 secured one on each of the drum hangers, (see Figs. 2, 9 and 12).

Through each of the bevel gears 91 passes a vertical shaft 93, the latter being free to slide vertically through the hub of said gear 91 but partaking of the rotary motion of said gear through a spline or sliding key 94. This driving mechanism is so arranged that each drum is free to be raised and lowered or to swing laterally without affecting the relations of the bevel gearing just described.

To return to the transmission case, Fig. 12, we have just traced the motion of the sliding pinion 80 to the vertical drum shafts 93, one for either drum. If the pinion 80 be slid forward from its rearmost position it will continue to mesh with gear 82 but will also engage large gear 95 beneath it. This large gear imparts motion to the wheels of the vehicle through gearing, chains and sprockets in the usual manner. The vertical drum shafts would now rotate each in the proper direction to drive the picking mechanism while the machine as a whole would advance by the rotation of its supporting wheels. The relative speeds being so proportioned that the picking fingers would travel rearwardly at the same speed that the machine advanced, or remain relatively stationary as to the cotton plants, the fingers would remain stationary while in the plants during their rearward movement. The third position would continue the pinion 80 in mesh with gear 95 but out of mesh with gear 82 whereby the vehicle would advance while the picking mechanism remained at rest. The next or fourth position for the pinion 80 is that shown in Fig. 12 where it is entirely out of engagement, and imparting no movement. The fifth or last position brings the pinion 80 in mesh with the gear 96 which through the gear 97 drives the large gear 95 and this drives the wheels of the vehicle only, but in a reverse direction and by reason of the relative diameters of gears 96 and 97 at a low speed, thus enabling the operator to slowly back the machine with the picking mechanism at rest.

It being understood that the two drums are counter-parts of each other, I will confine my description to one of them. The vertical drum shaft 93 has keyed and secured to it an upper sprocket wheel 98, (see Figs. 2, 3 and 15) and a lower sprocket wheel 99 (see Figs. 2, 3 and 16). Trained around these sprocket wheels are chains whose links are of special construction, an upper chain 100 and a lower chain 101.

Extending vertically between the upper and lower chains and pivoted in both at their articulated joints are tubular finger-bearing parts called carriers 102, Figs. 1, 2, 3, 14, 22 and 33 to 37. The chains travel an oblong path, straight-sided and with semi-circular ends. The upper and lower paths correspond. The upper path is formed between the margin of an inner plate 103 and an outer plate 104, (see Figs. 3, 14 and 15); the plane of these plates being below the plane of the upper sprocket 98 and its chain 100 whereby the path or track may be continuous, (uninterrupted by the sprocket). These plates are firmly secured in the drum structure, and one semi-circular end of their track is made concentric with the axis of the vertical shaft 93. The lower track, 105 and 106 is similarly shaped (see Figs. 16 and 27) and is arranged as a double track half above the plane of the lower chain 101 and half below it, both tracks continuing uninterruptedly throughout the path. Flanged rollers 107 are mounted upon each joint of the chain and are arranged to roll along the margins of the plates 105 and 106 (see Figs. 33, 34 and 49). The chains and tracks are so arranged that the carriers are accurately held to their path and are parallel to one another throughout. The weight of the carriers and upper chain is borne by small rollers 108 mounted on either side of the upper chain 100 to run upon the top surface of the track plates 103 and 104.

The carriers 102 are tubular, their upper ends terminating in a shank or carrier head 109. (See Figs. 19, 20, 33, 34, and 41). This head is secured to the carrier tube or barrel 110 and has freely mounted upon it a roller 111, which guides the carrier along its proper path. Upon the upper end of the carrier head 109 is keyed and pinned a cam-arm 112, provided at its outer end with a cam-roller 113 (see Fig. 33). A thimble 114 fits around the carrier head and into the holes in the chain links freely. Its particular purpose will appear later.

Projecting from the barrel of the carrier 102 are picking fingers, and the cam arms 112 are all keyed to the carriers 102 at the same angle with relation to the fingers.

The cam rollers 113 travel along an inverted track or groove 115 called the cam. The track of this cam is irregular and lies partly within and partly without the path of the carriers, whereby the carriers and the fingers are caused to assume various angular positions as they are moved along their track by engagement of the rollers 113 in groove of cam 115. (See Figs. 13 and 14). While the fingers are inserted in the plants and are moving rearward along the straight part of the carrier track the cam track is straight and in such a position that the fingers are directed squarely into the plants. The cam track 115 is so designed that while the fingers are being introduced into the plants and again while they are being withdrawn they are caused to assume this position practically at right angles to the direction of motion of the machine.

As soon as the fingers are withdrawn from the plants they are caused to incline backward to bring them through the stripper at a considerable rearward angle whereby the cotton upon them is stripped from them toward their points, the cam track being arranged around the center of shaft 93. The cam then continues parallel to the path of the carriers, still directing the fingers rearward while they are being cleaned by brushes located in their path, as in the lower right hand portion of Fig. 13. The cam track then changes direction to swing the cam arms, carriers and fingers from a receding angle to an advancing angle whereby the fingers are again introduced into the plants at approximately a right angle.

The lower chain 101 like the upper chain 100 is made up of flat links bored to fit freely upon the chain pivots, and the pivots of the lower chain are formed of round hollow pins 116 passing through the holes in the links and forming journals for the flanged rollers 107, (Figs. 34 and 49). These hollow pins 116 have a flange at the top to keep them in position and are fitted with an inner pin 117 projecting into a hole in the bottom of the carrier 102 at 118. This inner pin 117 is maintained in this position by a spring 119 surrounding it and thrusting upward against a shoulder upon it, the inner pin continuing downward and terminating in a button accessible through the base of the drum. By pulling this button downward against the action of the spring the upper end of the inner pin 117 is withdrawn from the carrier leaving the latter free to be pulled sidewise over an opening 120 in the base of the drum from which position it may be removed.

To remove the carrier it is first necessary to remove the cam arm 112. This is done by first removing a portion of the cam track 115, consisting of a removable part 121 which is flanged over and bolted to the top plate of the drum (see Figs. 13, 45 and 46), and which forms a part of the cam track 115. Its removal gives access to the cam arm 112. When the latter has been removed the thimble 114, Fig. 48 is withdrawn, whereby the carrier head is loose in the chain links 100 and may be swung out of position as shown in Figs. 47 and 49.

A slight outward clearance in the face of the outer track-plate 104 at 122 permits the roller 111 to take the inclined position shown in Fig. 49, while it is necessary to remove the two lower fingers to permit the carrier to drop sufficiently to remove it bodily from the machine.

A set of overlapping sheath links 123 are provided to cover the opening in the floor of the drum which forms the path for the lower chain 101 and for the lower ends of the carriers. These links 123 are shown in section in Fig. 49 and in plan view in Fig. 27, the latter figure showing a few of them removed, exposing the lower chain 101 and its flanged rollers 107. Each sheath link overlaps the preceding one in such a manner that there is no advancing edge presented to contact with the floor or margins of the plates upon which they bear and along which they slide.

Each carrier head 109 has journaled upon it a toothed sleeve 124 called a carrier pinion, fitted to revolve freely on the carrier head. Its outer teeth 125 are reduced in height at opposite sides by parallel bearing faces and engage with a fixed rack plate 126 which is provided with marginal teeth 127, whereby the carrier pinion 124 will rotate upon the carrier as the latter is moved along its path. The carrier pinion 124 is enlarged at its lower end to form an internal gear 128, which in turn meshes with a toothed pinion 129 formed upon the upper end of a vertical shaft 130 which extends vertically within the tubular shell 110 of the carrier 102 from top to bottom. The vertical shaft 130 has formed upon it a number of spiral toothed gears 131, one being provided for operating the pinion of each finger. (See Figs. 33 and 34.)

Meshing into the spiral gears 131 are spiral pinions 132 spirally toothed at 133. The latter are arranged crosswise of the carrier tube 110 and are provided with a recess or round hole socket 134 extending nearly through them into which the shank end 135 of the picking finger 136 is freely fitted. (See Figs. 36 and 42.)

The picking finger 136 is provided with an eccentric projection 137 which is arranged to enter an eccentric recess 138 at the inner end of the hole 134 of the spiral pinion 132 whereby the finger is caused to rotate with the spiral pinion, the eccentric projection acting as a key. (See Figs. 42, 43 and 54.)

The spiral pinion 132 is extended sufficiently in each direction from the teeth 133 to form journals 139 and 140. The journal 139 fits freely in an annular recess 141 of the socket 142 and the journal 140 fits freely in the hole through the nut or bushing 143. This nut is threaded to screw into the socket 142, and is retained in place by the jamb nut 144. This latter abuts against a shoulder 145 on the finger shank and retains it in the pinion. To remove the finger it is only necessary to unscrew and remove the jamb nut 144. To remove the pinion it is necessary to also remove the bushing 143.

It will be noted that the pinion 132 is beveled at its inner end and has endwise bearing at the end of the recess in the socket 142, at its center 145', (Fig. 42) giving the effect of a step bearing whereby the friction is much reduced. The direction of motion of the vertical spiral shaft is such as to thrust the pinion 132 inwardly and against its step.

The endwise thrust of the vertical shaft 130 due to the numerous spiral gears upon it is provided for in the left hand drum by thrust plates 146, fixed in the carrier heads 109 against which the upper end of said vertical shafts have endwise bearing. In the right hand drum these vertical shafts thrust downward due to the fact that they run in a direction opposite to those in the left hand drum. This thrust is provided for by thrust plates 147 in the bottom of the carriers against which the lower ends of the vertical shafts have bearing. By this arrangement all of the fingers rotate "right handed" and all of the spiral gears and pinions are alike.

The socket 142 fits in holes bored in opposite sides of the carrier tube 110 the inner end 148 being preferably fitted into a squared hole, a shoulder 149 on the socket fitting against the inside wall of the tube and the squared end is riveted or upset against the outside of the tube, thereby firmly fixing it in its position. The socket furthermore is cut away at 150 to permit the vertical shaft 130 to be inserted after the sockets are riveted in place.

Journal bearings 151 are provided at intervals for the vertical shafts 130. These are preferably rings of Babbitt metal tightly fitted in openings 153 and providing bearings for the shaft to turn freely. (Figs 20, 33 and 40.) These Babbitt rings are slightly larger than the spiral gears formed upon the vertical shafts to permit the shafts with their bearings to be put in place.

A socket supporting ring 152 fits the inside of the carrier tube 110 and is provided with an annular opening 153 through which is inserted the journal bearing 151 which fits it closely.

The ring 152 is apertured crosswise through its upwardly projecting rim at 154 and 155. (Figs. 37 and 40.) These openings register with those in the carrier tube 110 whereby a socket 142 may be inserted through them, fixing the ring firmly in position in the tube.

At the lower end of the tube is a bottom cup 156 secured in a similar manner, (Figs. 33, 34 and 44) which contains the thrust plate 147 already described and has an aperture through it to admit the pin 117 also previously described.

The carrier head 109 is likewise secured in the upper end of the carrier tube 110 by means of the upper socket 142 which extends crosswise through it as shown in Figs. 34, 35 and 41. Thus it will be seen that a light but strong and rigid construction of carrier is obtained which is without screws, bolts, nuts, rivets or pins which might loosen or fail. It is readily removable from the drum and the fingers are quickly removable from it.

Returning to a consideration of the carrier pinions 124, which by their rotation cause the fingers to rotate, it will be seen that the rack 126 extends but half way around the path of the carrier, viz., from end to end along the inner half of the path, corresponding to the time when the fingers are inserted in the cotton plants. At each extremity of the oblong path the rack is discontinued and is replaced by a smooth guide plate 157 whose marginal edge corresponds to the form of the path of the carriers. This guide plate is at a higher plane than that of the rack and is engaged along its edge by flattened surfaces 158 on the carrier pinions 124 whereby the said pinions are held from rotation while so engaged, but may move along their path freely. The flattened surfaces 158 of the pinions may be made as shown by cutting away the upper portions of the teeth at opposite sides and are in the same plane as the guide plate 157, while the teeth 125 of the pinions are in the plane of the rack 126. The extremities of rack and guide plate are so formed that the pinions will commence or cease their rotation smoothly and uniformly. The first tooth 159 is shown as cut down to half its normal height to permit a certain pinion tooth to pass it and permit engagement with the succeeding pinion tooth. In order to effect this with certainty and to insure the correct angular position of the pinion teeth a guide block 160 is secured as shown in Fig. 21 to engage the flattened surface 158 of the pinion 124 at the instant of the tooth engagement at the opposite side of the pinion, thereby preventing the pinion tooth 161 from fouling with the half tooth 159 of the rack which it is intended to miss. (See Fig. 21.) It will be understood that the number of teeth in both the rack and pinions is such that the same pinion tooth engages the first rack tooth at every circuit.

The train of gearing to the fingers is such that all fingers will make an even number of rotations in each circuit whereby the teeth on the fingers will be brought to the desired angular position while held from rotation, for reasons which will presently appear.

The picking finger 136 is of particular design to carry out certain objects of my invention, as heretofore stated. One of its novel features lies in the fact that the depth of the longitudinal V shaped groove 163 is just equal to the depth of the lateral grooves 164, between the teeth, whereby the bottoms of the grooves form a continuous plane or flat surface extending to the periphery of the circle of the section. The finger may be described as a round tapered bar flattened along one side and having raised or formed upon such flat surface and extending half way across it, crosswise pointed teeth.

The crosswise grooves 164 are of such form that the metal left between them forms rigid-like teeth 165, the points of said teeth being adjacent to the longitudinal groove 163. The section of the latter is such that the ends of the teeth 165 are undercut at 166, thus giving the teeth points a sharp or acute angle as shown in Fig. 51. The purpose of thus forming the points of the teeth is that they may engage minute strands or fiber of cotton with which they may come in contact, and while rotating will wind upon themselves such strand or fiber and with it other cotton adhering thereto.

The teeth 165 are shown as diagonal or inclined toward the finger point. This inclination, together with the tapered form of the finger, facilitates the stripping or endwise removal of the cotton wound upon the finger as the latter is pulled through between the metallic edges of the stripper.

It will be understood that in operation the frequent contact of the revolving fingers with the stalks or branches of a cotton plant is apt to cause sap to adhere to the fingers and especially in the grooves thereof.

Brushes in the path of the fingers are provided to remove this sap. They act upon the fingers while the latter are held from rotation by reason of the carrier pinions 124 having their flat surfaces 158 in contact with the guide plate 157. All of the fingers have their teeth in the same angular relation to the eccentric 137. Hence it follows that if the spiral pinions 132 are so set that the eccentric holes 138 are correctly and uniformly positioned in every case, the fingers will all present their flat bottomed grooves to the brushes in the most effective manner. The bristles or wires of the brushes may thus find their way to the flat surfaces of the grooves 164 between the teeth, thence across the flat surface of the longitudinal groove 163, thereby cleaning every part thereof thoroughly.

The finger grooves are in the same angular position when being stripped as when being brushed. In fact the two operations are nearly simultaneous. The finger teeth and finger grooves all being at their most advantageous angle for being cleaned are also at their most advantageous angle for being stripped of their cotton between the horizontal edges of the stripper. As all fingers are alike, the replacement of the fingers will not affect this relation. In Figs. 50 and 54, 135 is an enlarged part of the finger whereby a shoulder 145 is provided to retain the finger in its driving pinion 132 as already described. The purpose of such enlargement of the finger is to insure its breakage, in case of accident, outside of the pinion instead of within it, as might be the case were it of the same diameter as the finger body.

In Figs. 55, 56 and 57 I illustrate an alternative form of tooth in which the finger and the longitudinal groove 163 with its flat surface is similar to that shown in Figs. 51, 52, and 53. The teeth, however, instead of being cut diagonally are cut squarely across the finger, whereby exceedingly sharp needle-like points are given to the teeth as shown in Fig. 55. Facility for readily stripping the cotton from the finger teeth is afforded by the flat incline of the surfaces 167 of the teeth. In the design shown in Figs. 55, 56 and 57 it will be noted that the flat surfaces 163 and 164, forming the bottom of the longitudinal and the crosswise grooves, are continuous as before for readily removing sap therefrom.

A stripping device is shown in Figs. 13, 30, 31 and 32 consisting of flat fingers 170 between which the picking fingers pass, their edges being lipped to obtain a sharp angle at the stripping edges 171. (Fig. 30.)

The stripper fingers 170 are provided each with a dove-tailed recess 172 at their back (see Fig. 13). They are so fitted that the stripping grooves 173 formed between them will register with the planes of the picking fingers 136 as carried through said grooves by the carriers. (See Figs. 30 and 31.)

The stripper fingers fit freely upon a dove-tailed projecting strip 174 of the stripper column 175, being supported at the bottom by the half stripper finger 176 which is bolted near the bottom end of said stripper column. The stripper fingers are further secured to the stripper column by being clamped endwise thereon by the set screw 177 through the lug 178 of the column, and the said set screw when tightened against the top finger, acts to clamp them firmly together. To remove the stripper fingers from the column the set screw 177 must be loosened, and the bottom finger 176 removed, when the whole set of fingers may drop from the column.

The stripper column 175 is secured to the top and bottom plates of the drum by bolts through end flanges 179 thereon, at top and bottom. Two of these bolts 180 and 181 at top and bottom respectively, may act as vertical hinge-pivots about which the whole column may be swung outwardly and away from the drum sufficiently to permit the stripper fingers to drop from it when released. The spike roller 204 may be also removed, if necessary, when it is desired to swing the stripper column outwardly and to detach the stripper fingers. The other bolts in the flanges 179 of the stripper column retain the column in place.

Back of the stripper fingers is a square vertical bar 182 extending from the top to the bottom of the stripper column and fitted to slide up and down in square apertures 183 (Figs. 13 and 27) in the end flanges of the column. Mounted upon this square bar are brush holders 184, one for each of a vertical row of picking fingers. The brush holder 184 has a square aperture 185 through it to fit the bar 182. (See Figs. 58 and 59.) Extending laterally therefrom is an arm 186 pierced with a number of holes 187 from which project fine wires forming a brush 188, the top surface of which brush is caused to engage the under side of a picking finger along its grooved and toothed part.

The brush holders 184 are strung upon the square brush bar 182, the bottom holder being bolted to the bar at 189 and are clamped firmly lengthwise of the brush-bar by a tapered key 190, (Fig. 31) and a projecting lug 191 is secured to the bar near its upper end and is supported and pressed upward by a spring 192. The said spring thus acts to force all of the brushes upward against the under side of the fingers. A set screw under the spring at 193 adjusts the spring tension while a set screw 194 limits its rise. (See Fig. 29.)

In the top end of the brush bar is mounted a friction roller 195, (Fig. 32) engaged by a cam roller 196 on the cam shaft 197. This cam shaft is operated by a worm gear 198 which is slowly rotated by a worm 199 on the worm shaft 200. The latter carries a worm gear 201 which is engaged by a worm 202 on the vertical drum shaft 93. These parts are so arranged that the rotation of the drum shaft causes the cam 196 to revolve slowly. The cam is circular except for a notch 203 in its periphery which notch when engaged by the cam roller 195 permits the latter with the brush bar and brushes to rise, due to the action of the spring 192 as far as permitted by the set screw 194. The continued rotation of the cam 196 again depresses the brushes, holding them down and out of contact with the fingers until the notch 203 again permits the brushes to rise. This intermittent brushing is generally sufficient. I preferably apply the brushes at intervals and for but a few revolutions at a time as they consume power and wear the fingers. I preferably set the cams on the two drums so that they will act alternately.

204 is a vertical roller with projecting spikes adapted to keep the stripper fingers clear of accumulations of cotton. It is driven by chain 205, sprocket 206 on the drum shaft 93 and sprocket 207 on the spike roller 204, (Figs. 28 and 29).

The side of the drum next to the plants is formed of a series of strips 208 lying close to the carriers and between the horizontal rows of fingers. (Figs. 22 to 26.) These strips prevent the plant from becoming entangled with the carriers and keep them out of the drums. They also furnish support for some thin metal springs 209 called spring-leaves. These latter act to disturb and turn the open cotton so as to insure its contact with the picking fingers. The strips 208 are formed of square bars locked at the front end between lugged collars 210 which are strung on a vertical rod 211 and clamped thereon by nuts 212. (Figs. 23 and 25.) At the rear end plates 213 are riveted to the bars or strips 208 notched to fit around a vertical rod or bolt 214.

215 are short tubes or separators to space the strips 208 and between which they are clamped endwise of the vertical bolt 214 by the nuts 216. The bolt 214 is set back farther from the plants than the strips 208 so as not to engage and pull off unripe bolls from the plants. The plates 213 also afford surfaces against which the rotating fingers will continue to wind their attached cotton.

Upon each bar or strip 208 is a pointer 217 which is so placed as to guide the picking fingers through between the strips in case they should become bent. This pointer 217 would be first engaged by the finger close to the carrier, then progressively outward to its point at which the finger would have safely passed the bars or strips 208.

At the inside bottom edge of each drum is attached a series of elastic strips which project toward the center of the plant and which are inclined diagonally rearward forming a sort of yielding platform or shelf 218 at each side of the plants to catch cotton which would otherwise fall to the ground. (Figs. 1 and 27.)

At the inner top edge of each drum and extending nearly its length is hinged a vertical plate or curtain 219. (Figs. 1, 9, and 11.) To the lower edges of both plates and extending between them is a horizontal plate 220 called the deflector plate. This plate is provided at each side of its middle portion with longitudinal strips as shown, arranged to bear upon the tops of the plants as in Fig. 1, the purpose of which is to hold down the tops of tall plants to where they may be reached by the picking fingers.

The hinged connections do not interfere with the free lateral swinging of the drums already described nor to the outward swinging of one of the drums to the position shown in Fig. 11.

The drums are connected with each other at both front and rear by a right and left hand threaded rod 221 with trunnioned nuts 162 pivotally mounted in the drum ends. (Figs. 9 and 10.) By turning this rod the drums are caused to approach or separate whereby the opposed points of the picker fingers from each drum may be separated or brought to the central plane or may overlap or intermesh to some extent. By disconnecting one end of the rods 221 the drum may be swung to the position shown in Fig. 11.

The general structure and framing of the drum consists in a top plate 68, floor plates 222 and bottom plates 223, connected together by front plate 224 and rear plate 225, also by bolts or rods 211 and 214 (Figs. 23 and 24). In addition to this the top and bottom of the drum are connected by a central vertical drum column 168 and a forward drum column 169. These two columns are accurately fitted at their upper ends through annular openings in the following parts: the top plate of the drum 68, the main cam 115; the inner guide plate 103; the guide plate for the pinions 157, and the rack plate 126. At their lower ends these columns pass through and are accurately fitted to the lower chain guide plates 105 and 106 and the bottom drum plate 223. A flanged plug 227 also nuts 67, are screwed into the tops of these columns whereby the parts at the top of the drum are firmly clamped together. Separators 228 are introduced between the different parts to fix them at their proper levels and shoulders are formed on the columns at 229. One of the plugs 67 is used as a nut for the forward lifting screw 66. (Figs. 3, 5, and 6.)

The lower ends of the columns 168 and 169 are internally threaded to receive the clamping plugs 230 which clamp the bottom plate and guide plates 105 and 106 firmly together against the shoulders 231 of the columns, separators 232 being introduced to fix these parts at their proper levels. The clamping plugs 230 are partially split horizontally and are spread or jammed in their thread by the set screw 233. (Figs. 7 and 8.)

The rear column 234 extends from the upper to the lower sprocket wheels around the shaft 93. (Figs. 2 and 3.) Journal bearings 235 are formed in it at either end. A shouldered bushing 236 centered in the top plate 68 and cam 115, and clamped by the nut 237 forms a bearing for shaft 93 at the top of the drum. A thrust collar 238 carries the weight of shaft 93.

Extensions on the cam 115 through which are fitted through-bolts 239 serve to stay the outer guide plate 104 to the cam and top plate, while sleeves 240 on the bolts fix the outer guide plate at its proper level. See Fig. 1. Thus it will be seen that this column structure fixes all of the stationary parts in their correct relative positions while all clamping nuts or other securing parts are adjusted from outside the drum.

Figs. 60 and 61 illustrate the machine in side elevation and plan showing the cotton plants in their natural position at 241. A hood 242 extends horizontally for some distance forward of the drums whereby the tall plants are pushed forward and downward as far as necessary for the machine to pass over them.

It will be noted that the plants are deflected to the full extent required in advance of the introduction of the fingers 136 among the stalks and branches. By this means further movement of the plants and their stalks is prevented, and since the fingers have no movement relative to the plants it follows that there will be no lateral strains placed upon the fingers by the stalks to bend or break them, once the fingers are inserted in the plants.

Any suitable cotton elevating mechanism of the continuous belt or carrier or other suitable form, as indicated at 243, is employed to receive the picked cotton and discharge it from the machine.

I do not herein claim the cotton picker fingers illustrated in Figs. 50 to 57, inclusive, as the same form the subject-matter of my application Serial No. 601,913, filed the 10th day of January, 1911.

What I claim and desire to secure by Letters Patent, is:—

1. A tubular carrier, a single-piece picker finger socket extending transversely therethrough, a rotatable pinion mounted in the socket having teeth at its middle portion and journals at each end, one journal having its bearing in one end of the socket, and a removable ring inserted in the opposite end of the socket and forming a bearing for the other journal of the pinion, said ring retaining said pinion in place.

2. A tubular carrier, a single-piece picker finger socket extending transversely therethrough, a rotatable pinion mounted in the socket having teeth at its middle portion and journals at each end, one journal having its bearing in one end of the socket, and a removable ring inserted in the opposite end of the socket and forming a bearing for the other journal of the pinion, said ring retaining said pinion in place, and an outer ring adapted to engage a shoulder on a picking finger when inserted in said pinion and a picking finger provided with a shoulder.

3. The combination of a tubular carrier, transverse finger sockets extending through opposite walls of the carrier, a shaft arranged lengthwise of the carrier, picking fingers mounted in said sockets spirally geared to said shaft, a journal bearing for said shaft, a ring within said tubular carrier, said ring being secured in position by engagement with one of said transverse finger sockets and forming a support for said shaft.

4. The combination with a vertical carrier tube, a vertical shaft, and picking fingers of a ring fitting the inside of the carrier tube, a transverse finger socket inserted through its walls and holding the ring, said ring being provided with a journal bearing for said vertical shaft and spirally geared to the picking fingers in the said finger socket.

5. In combination, a tubular finger carrier, sockets and finger pinions therein, picker fingers, a shaft arranged lengthwise of the carrier and spirally geared to the finger pinions, a journal bearing surrounding said shaft, said tubular carrier having an aperture larger than the gears on said shaft whereby the latter may be removed endwise with its journal bearing and operative connections between the fingers and finger pinions.

6. In combination, a tubular finger carrier, sockets and finger pinions therein, picker fingers, a shaft arranged lengthwise of the carrier and spirally geared to the finger pinions, a journal bearing surrounding said shaft, said tubular carrier having an aperture larger than the gears on said shaft whereby the latter may be removed endwise with its journal bearing, and a lower cup forming an end step for said shaft, and secured in the tubular carrier and operative connections between the fingers and finger pinions.

7. In combination, a tubular finger carrier, sockets and finger pinions therein, picker fingers, a shaft arranged lengthwise of the carrier and spirally geared to the finger pinions, a journal bearing surrounding said shaft, said tubular carrier having an aperture larger than the gears on said shaft whereby the latter may be removed endwise with its journal bearing, and a top piece secured to the tubular carrier and carrying external and internal gears and operative connections between the fingers and finger pinions.

8. A vertical shaft with an upper and lower sprocket wheel thereon, means for rotating the shaft, an endless chain at top and bottom engaging each sprocket wheel, finger-bearing carriers extending between the chains and pivotally connected therewith, means for readily detaching the lower ends of the carriers and endless guides for both the upper and lower chains.

9. In a cotton picker, an endless chain comprising overlapping links, means for actuating the chain, removable bushings inserted through said links and forming pivot joints for said chain, and finger-bearing carriers having picker fingers and upwardly extending pivot pins inserted in said chain bushings, for the purpose set forth.

10. In a cotton picker, the combination with the carriers, of a lower chain comprising overlapping links, hollow chain pins inserted through said links, and pivots extending yieldingly through said hollow chain pins upwardly and into the ends of the carriers whereby said carriers may be disconnected and detached from said chain by withdrawing said pivots.

11. The combination with the finger carrier having picker fingers, of a lower chain for actuating the finger-carriers having a vertically detachable pivotal connection with each carrier.

12. In a cotton picker, upper and lower actuating chains having picker fingers and a series of finger carriers pivotally connected at their ends to said chains, and a removable element in the pivotal connections of one of said chains whereby any one of the carriers may be readily removed without disconnecting other operative parts, substantially as shown and described.

13. In a cotton picker, finger-bearing carriers having picker fingers, actuating chains therefor, rollers on the carriers and chains, drum columns extending from top to bottom of the mechanism and a rack, cam and guide plates constituting fixed elements all apertured to fit over said columns whereby they are fixed and retained in their proper lateral positions, one of said columns being hollow; and a sprocket shaft located within said hollow column.

14. In a cotton picker, finger-bearing carriers having picker fingers, actuating chains therefor, rollers on the carriers and chains, drum columns extending from top to bottom of the mechanism and a rack, cam and guide plates constituting fixed elements all apertured to fit over said columns, said columns having shoulders to fix the positions of two of said plates in combination with rings or separators between others of these plates and with end nuts on the columns whereby all of the fixed elements of the picking mechanism are firmly bound together in their proper vertical positions; one of said columns being hollow; and a sprocket shaft within said hollow shaft.

15. In a cotton picker, finger-bearing carriers having fingers, actuating chains therefor, rollers on the carriers and chains, drum columns extending from top to bottom of the mechanism and a rack, cam and guide plates constituting fixed elements all apertured to fit over said columns, said columns having shoulders to fix the positions of two of said plates in combination with rings or separators between others of these plates and with end nuts on the columns whereby all of the fixed elements of the picking mechanism are firmly bound together in their proper vertical positions; one of said columns being hollow; a sprocket shaft journaled therein; a drum-hanger; said shaft being free to move endwise through the drum-hanger; an adjusting screw connecting the drum-hanger and one of said columns; and an adjusting screw connecting the hanger and drum.

16. In a cotton picker, the combination of supporting columns having shoulders, a bottom plate, and a guide plate, and a nut screwed into the base of each column and flanged or shouldered to clamp the parts at the bottom of the column together, said nut being operative or accessible from outside but not projecting; said columns being hollow; one of them surrounding a sprocket shaft; and a sprocket shaft.

17. In a cotton picker, the combination of supporting columns having shoulders, a bottom plate, and a guide plate, and a nut screwed into the base of each column and flanged or shouldered to clamp the parts at bottom of the column together, and means for locking said nut, said columns being hollow, one of them surrounding a sprocket shaft; and a sprocket shaft.

18. In a cotton picking machine, the combination of a motor and its shaft, picking mechanism and a depending actuating shaft therefor, means embodying actuating gearing for pivotally supporting the picking mechanism and permitting lateral adjustment thereof, and means for imparting movement from the motor shaft to the picking mechanism.

19. In a cotton picking machine, the combination of a motor and its shaft, picking mechanism and a depending actuating shaft therefor, gearing for actuating said shaft embodying pivotal mounting for the picking mechanism, means for imparting traveling movement to the machine and gearing therefor, and an adjustable gear in spline engagement with the motor shaft for actuating said gearing.

20. The combination, with upper and lower carrying chains and rack and cam mechanism, of a plurality of vertically arranged finger carriers having laterally arranged fingers, and means for actuating the carrying chains and imparting movement to the fingers, and longitudinally movable pins carried by the lower chain and engaging sockets in the ends of the carriers.

21. The combination with a plurality of finger carriers having rotatable fingers and cam arms and means for moving the carriers through a predetermined path and for actuating their fingers; of a cam track engaging the cam arms for independent rotation of the carriers provided with a removable portion for access to the carriers.

22. A cotton picker having vertically arranged pivotally mounted drums at each side of a middle clearance opening with laterally extending traveling rotatable fingers, means for actuating the fingers, and means for bodily adjusting either drum and its parts outwardly.

23. A cotton picker having vertically arranged drums at each side of a middle clearance opening with laterally extending traveling rotatable fingers, means for actuating the fingers, means for pivotally mounting each drum at its upper end, and means for adjusting either drum and its parts outwardly upon said pivotal mounting.

24. The combination with a supporting frame, of gearing carried thereby, pendent pivotally mounted drums having finger carriers and fingers and actuating mechanism therefor, a shaft for imparting movement from said gearing to said mechanism, and vertically arranged adjusting screws for the drum.

25. The combination with a supporting frame, of gearing carried thereby, pendent pivotally mounted drums having finger carriers and fingers and actuating mechanism therefor, a shaft for imparting movement from said gearing to said mechanism, and vertically arranged adjusting screws for the drum, said shaft and screws having means connecting them with the frame gearing for lateral adjustment.

26. The combination with a supporting frame and a drum having finger mechanism and fingers pendently and pivotally supported from said frame at each side of a working space, and vertical adjusting screw mechanism for the drums; of a transverse shaft having an operating wheel and gearing connecting it with the gearing for each drum.

27. In a cotton picker, a vertical post having a lengthwise dove-tail projection or strip, stripper fingers with dove-tailed recesses formed in them to fit over and lock upon the said dove-tailed strip of the post, the lowermost stripper finger being bolted to the lower end of said post, and means for clamping said stripper fingers endwise of said post.

28. In a cotton picker, a supporting post, a series of stripper fingers having tapered upper and lower edges arranged one above the other in a vertical row thereon, means for removably securing the lowermost stripper finger and a clamping screw to clamp said fingers together and against said lowermost finger to fix their vertical position upon said post.

29. The combination with the picker fingers and actuating mechanism therefor, of a vertically arranged bar provided with a series of laterally arranged brushes adapted to engage the picker fingers, and a spring for pressing the bar and brushes against said picker fingers.

30. The combination with the picker fingers and actuating mechanism therefor, of a vertically arranged bar provided with a series of laterally arranged brushes adapted to engage the picker fingers, a spring for pressing the brushes into engagement with the picker fingers, and means for adjusting the tension of the spring.

31. The combination with the picker fingers and actuating mechanism therefor, of a vertically arranged bar provided with a series of laterally arranged brushes adapted to engage the picker fingers, a spring for pressing the brushes into engagement with the picker fingers, and means for intermittently actuating the brushes and bar vertically.

32. In a cotton picker, the combination of carriers having picker fingers projecting laterally therefrom, operating means therefor, a vertical brush bar and a series of brushes projecting therefrom in the path of said fingers, a cam for operating said brushes to alternately bring them into contact with said fingers or move them out of such contact, and means for operating said cam connected with the operating means for said picking fingers whereby the brushes are automatically moved into and out of contact with said fingers.

33. The combination with the picker fingers and actuating mechanism therefor, of brushes, and cam mechanism for intermittently adjusting the brushes vertically to operative position with relation to the fingers.

34. The combination with the picker fingers and actuating mechanism therefor, of a brush carrying bar having brushes and a roller, a notched cam engaging said roller, means for actuating the cam, and a spring acting to force the roller into engagement with the cam.

35. The combination with the picker fingers and actuating mechanism therefor, of a brush carrying bar having brushes and a roller, a notched cam engaging said roller, means for actuating the cam, a spring acting to force the roller into engagement with the cam, and an adjustable stop for the brushes.

36. The combination with the picker fingers and actuating mechanism therefor, of a brush carrying bar having brushes and a roller, a notched cam engaging said roller, means for actuating the cam, a spring acting to force the roller into engagement with the cam, and means for adjusting the tension of the spring.

37. The combination with the picker fingers and actuating mechanism therefor, of a polygonal brush carrying bar, a series of freely slidable brush carriers thereon having corresponding sockets, means for clamping all of the brush carriers endwise, means for securing the endmost brush carrier, means for intermittently actuating the brush bar, and means for limiting its movement.

38. In a cotton picker, the combination of a supporting carriage, a motor and its shaft, pivotally mounted depending drums at each side of a middle clearance opening provided with series of picker fingers and means for actuating them, a cross shaft geared with the engine shaft, and shafts mounted in the drum and geared with the cross shaft for imparting movement to the picker fingers at varying positions of the drum.

39. In a cotton picker, the combination of a supporting carriage, a motor and its shaft, pivotally mounted depending drums at each side of a middle clearance opening provided with series of picker fingers, means for actuating them, cotton elevating mechanism, a cross shaft geared with the engine shaft, and shafts mounted in the drum and geared with the cross shaft for imparting movement to the picker fingers and elevating mechanism at varying positions of the drum.

40. In a cotton picker, the combination of a supporting carriage, a motor and its shaft, pivotally mounted depending drums at each side of a middle clearance opening provided with series of picker fingers, and means for adjusting the drums at varying positions and for automatically locating them and the picker fingers for operation.

41. In a cotton picker, depending picker finger drums at each side of a central opening and having series of picker fingers, in combination with a transverse flexible plant deflector hinged to each drum.

42. In a cotton picker, depending picker finger drums at each side of a central opening and having series of picker fingers, in combination with a transversely disposed flexible deflector consisting of depending portions hinged to each drum having an intervening plant deflector plate.

43. In a cotton picker, depending picker finger drums at each side of a central opening and having a series of picker fingers, in combination with a longitudinally disposed gathering hood connected with the drums and extending in front thereof for pressing the plants downwardly, and similarly disposed side gathering strips.

44. The combination with the series of picker fingers, of intervening longitudinal strips forming a side of the working space, said strips having plates at one end, and said plates projecting into the path of the fingers to retain the cotton thereon.

45. The combination with the series of picker fingers, of intervening longitudinal strips forming a side of the working space, said strips having plates at one end and projecting into the path of the fingers to retain the cotton thereon, and vertical rods to which said strip are attached; separating spacers between the strips and clamping means for the plates and spacers.

46. The combination with a pair of picker drums spaced apart to form a lengthwise central plant passage, of cotton-picking instrumentalities mounted in each drum; means for operating them; and a plant-deflecting mechanism mounted in the upper portion of said plant passage and extending transversely thereof, said plant - deflecting mechanism operating to bend the tops of the plants into the paths of the picker fingers when the machine is in operation and comprising lateral members one hinged to one drum and the other hinged to the other drum, and also comprising intermediate transverse portions the opposite edges of which are hinged respectively to the members that are hinged to the drums.

47. The combination in a cotton picker of a series of traveling picker finger carriers severally provided with picker fingers and with picker finger actuating mechanism, with a vertical column provided with laterally projecting stripping edges between which said picker fingers are drawn to strip them of cotton, said column being pivotally mounted to swing outwardly and away from the path of the picker fingers, and a removable means for locking said column in place to have its stripping edges in operative relation to the picker fingers.

48. The combination of a drum hanger frame; a drum; cotton picking and stripping instrumentalities mounted in said drum; a pivotal connection between said hanger frame and drum to permit the same to be swung outwardly and inwardly on the picker frame, and means for vertically adjusting the drum from and toward the picker frame.

49. In a cotton picker, the combination of a power-driven gear with a cross-shaft carrying a gear meshing with the power-driven gear; pinions on the opposite ends of said cross-shaft framework of the machine; a pair of horizontal shafts operatively mounted in the framework and each provided with a gear that meshes with a pinion on the end of the cross-shaft and each provided at an end with a pinion that meshes with a gear on a vertical shaft; a pair of vertical shafts each provided with a gear that meshes with a pinion on the inward end of the horizontal shaft; a pair of laterally swingable drums each containing picking instrumentalities; a hinge connection between each of said drums and said frame; said vertical shafts being provided with sprocket wheels; and driving connections between said sprockets and the cotton-picking instrumentalities in the drums; the axes of the hinging devices coinciding with the axes of the horizontal shafts.

In testimony whereof I affix my signature in presence of two witnesses.

BRUCE CLARK WHITE.

Witnesses:
C. M. CLARKE,
CHAS. S. LEPLEY.

Copies of this patent may be obtained for five cents each, by addressing the "Commissioner of Patents, Washington, D. C."